US008050239B2

(12) United States Patent
Hirano et al.

(10) Patent No.: US 8,050,239 B2
(45) Date of Patent: Nov. 1, 2011

(54) RADIO COMMUNICATION METHOD AND RADIO COMMUNICATION DEVICE

(75) Inventors: Jun Hirano, Yokosuka (JP); Tien-Ming Benjamin Koh, Singapore (SG)

(73) Assignee: Panasonic Corporation, Osaka (JP)

( * ) Notice: Subject to any disclaimer, the term of this patent is extended or adjusted under 35 U.S.C. 154(b) by 655 days.

(21) Appl. No.: 10/550,529

(22) PCT Filed: Mar. 26, 2004

(86) PCT No.: PCT/JP2004/004284
§ 371 (c)(1),
(2), (4) Date: Jul. 12, 2006

(87) PCT Pub. No.: WO2004/088878
PCT Pub. Date: Oct. 14, 2004

(65) Prior Publication Data
US 2007/0019666 A1    Jan. 25, 2007

(30) Foreign Application Priority Data

Mar. 31, 2003   (JP) .................................. 2003-097054

(51) Int. Cl.
*H04W 4/00* (2009.01)
*H04B 7/212* (2006.01)
*H04M 3/42* (2006.01)
(52) U.S. Cl. ...................... 370/338; 370/443; 455/414.1
(58) Field of Classification Search ................... 370/338, 370/443; 455/414
See application file for complete search history.

(56) References Cited

U.S. PATENT DOCUMENTS

| 5,539,730 A | 7/1996 | Dent |
| 5,852,405 A | 12/1998 | Yoneda et al. |
| 5,933,420 A | 8/1999 | Jaszewski et al. |
| 7,154,877 B2 * | 12/2006 | Le et al. ........................ 370/346 |
| 7,280,518 B2 * | 10/2007 | Montano et al. .............. 370/338 |
| 2002/0120740 A1 | 8/2002 | Ho et al. |

(Continued)

FOREIGN PATENT DOCUMENTS

CN          1124076          6/1996

(Continued)

OTHER PUBLICATIONS

Japanese Office Action dated Jun. 19, 2007 with English Translation thereof.

(Continued)

*Primary Examiner* — Kamran Afshar
*Assistant Examiner* — Omoniyi Obayanju
(74) *Attorney, Agent, or Firm* — Dickinson Wright PLLC

(57) ABSTRACT

The present invention discloses a technique for avoiding a signal collision in a wireless medium to improve communication throughput. According to this technique, in a radio communication system composed of a plurality of radio communication devices in such a manner that other radio communication devices exist within the communication area of a radio communication device, a given radio communication device is assigned a time slot periodically so that it can access the wireless medium in the time slot at higher priority than the other radio communication devices. This is achieved as follows: The radio communication device monitors the wireless medium, detects other radio communication devices operating within the communication area of the radio communication device, and divide communication time on the wireless medium into time slots of equal width according to the number of other radio communication devices. Then, each radio communication device selects one of these time slots so as not to share the selected time slot with any other radio communication device, and uses a waiting time shorter than those of the other radio communication devices to access the wireless medium in the selected time slot.

10 Claims, 26 Drawing Sheets

U.S. PATENT DOCUMENTS

| | | | |
|---|---|---|---|
| 2002/0126692 A1* | 9/2002 | Haartsen | 370/450 |
| 2003/0012167 A1 | 1/2003 | Benveniste | |
| 2003/0058826 A1 | 3/2003 | Shearer, III | |
| 2003/0214928 A1* | 11/2003 | Chuah | 370/336 |
| 2004/0028018 A1* | 2/2004 | Cain | 370/338 |

FOREIGN PATENT DOCUMENTS

| | | |
|---|---|---|
| EP | 1111846 | 6/2001 |
| JP | 5235845 | 9/1993 |
| JP | 8256153 | 10/1996 |
| JP | 10322341 | 12/1998 |
| JP | 2001333067 | 11/2001 |
| JP | 2002158628 | 5/2002 |
| JP | 2002247048 | 8/2002 |
| JP | 2002271830 | 9/2002 |
| JP | 2002319895 | 10/2002 |
| WO | 02/093831 | 11/2002 |

OTHER PUBLICATIONS

PCT International Search Report dated Jul. 13, 2004.

IEEE standard 802.11, "Wireless Medium Access Control (MAC) and Physical (PHY) Specifications," IEEE, Inc., New York 1997, pp. 71-99, and pp. 123-160.

IEEE Std 802.11e/D4.2, "Medium Access Control Enhancements for Quality of Service," Feb. 2003 (Draft Supplement to IEEE Std 802.11, 1999 Edition), pp. 12-18, and pp. 60-86.

Supplementary European Search Report dated Feb. 11, 2011.

S. Mangold, et al., "IEEE 802.11e Wireless LAN for Quality of Service," XP-002251598, Feb. 2002, pp. 1-8.

* cited by examiner

| NUMBER OF OTHER IHCs | SHARE_MODE | NUMBER OF SLOTs | SHARE_SLOT DURATION |
|---|---|---|---|
| 0 | 0 | 1 | SHARE_PERIOD |
| 1 | 1 | 2 | SHARE_PERIOD /2 |
| 2-3 | 2 | 4 | SHARE_PERIOD /4 |
| 4-7 | 3 | 8 | SHARE_PERIOD /8 |
| 8-15 | 4 | 16 | SHARE_PERIOD /16 |
| 16-31 | 5 | 32 | SHARE_PERIOD /32 |
| 32-63 | 6 | 64 | SHARE_PERIOD /64 |
| 64-127 | 7 | 128 | SHARE_PERIOD /128 |

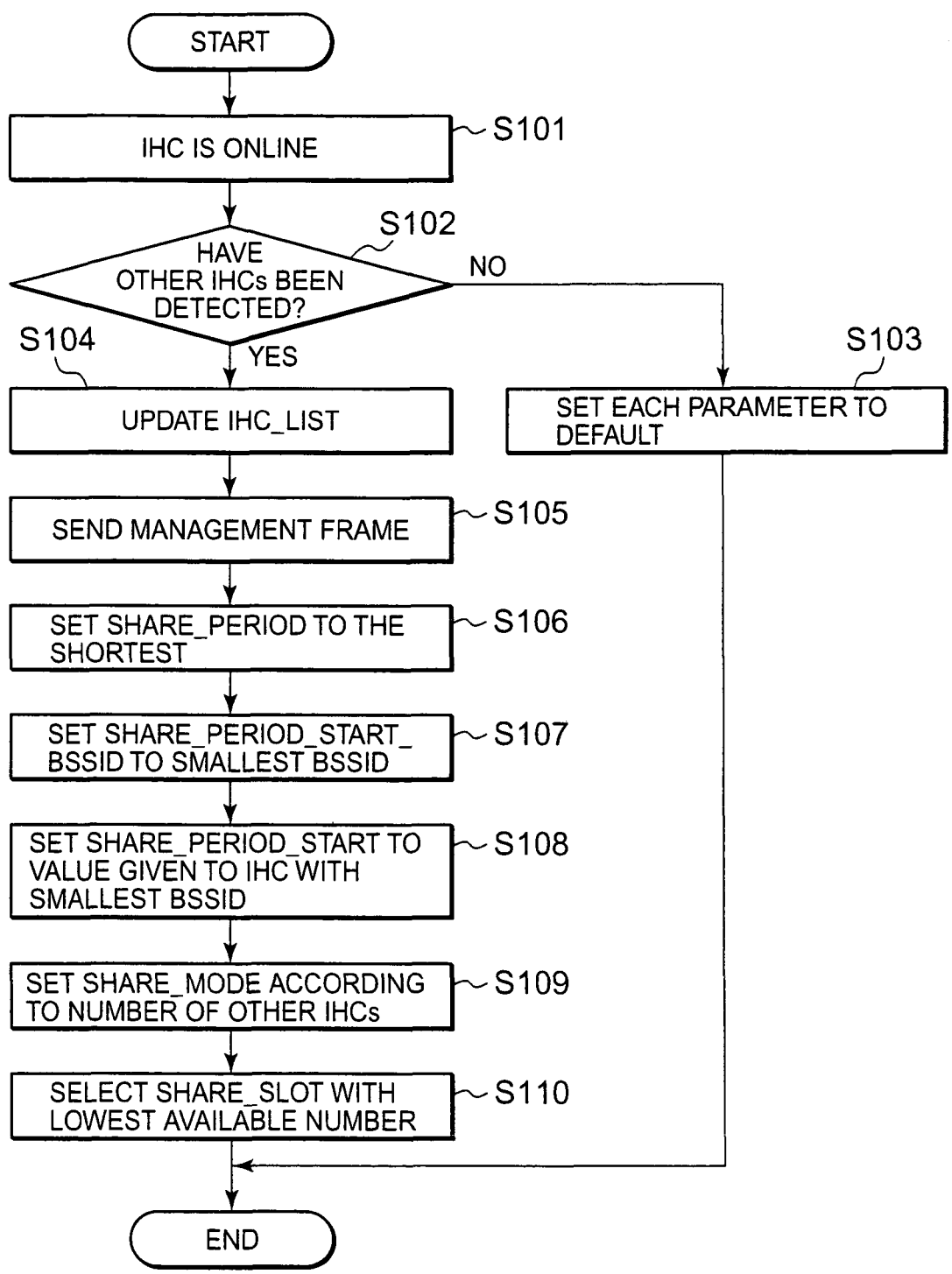

| IHC | IHC1 |
|---|---|
| BSSID | 1 |
| SHARE_PERIOD | 40 |
| SHARE_MODE | 0 |
| SHARE_SLOT | 0 |
| SHARE_PERIOD_START | Timer set A |
| SHARE_PERIOD_START_BSSID | 1 |
| IHC_LIST | – |

WMUM OF IHC1

| IHC | IHC2 |
|---|---|
| BSSID | 2 |
| SHARE_PERIOD | 40 |
| SHARE_MODE | 1 |
| SHARE_SLOT | 0 |
| SHARE_PERIOD_START | Timer set A |
| SHARE_PERIOD_START_BSSID | 1 |
| IHC_LIST | IHC1 |

| IHC | IHC1 |
|---|---|
| BSSID | 1 |
| SHARE_PERIOD | 40 |
| SHARE_MODE | 1 |
| SHARE_SLOT | 0 |
| SHARE_PERIOD_START | Timer set A |
| SHARE_PERIOD_START_BSSID | 1 |
| IHC_LIST | IHC2 |

| IHC | IHC2 |
|---|---|
| BSSID | 2 |
| SHARE_PERIOD | 40 |
| SHARE_MODE | 1 |
| SHARE_SLOT | 1 |
| SHARE_PERIOD_START | Timer set A |
| SHARE_PERIOD_START_BSSID | 1 |
| IHC_LIST | IHC1 |

| IHC | IHC2 |
|---|---|
| BSSID | 2 |
| SHARE_PERIOD | 30 |
| SHARE_MODE | 0 |
| SHARE_SLOT | 0 |
| SHARE_PERIOD_START | Timer set B |
| SHARE_PERIOD_START_BSSID | 2 |
| IHC_LIST | – |

| IHC | IHC3 |
|---|---|
| BSSID | 3 |
| SHARE_PERIOD | 30 |
| SHARE_MODE | 2 |
| SHARE_SLOT | 0 |
| SHARE_PERIOD_START | Timer set A |
| SHARE_PERIOD_START_BSSID | 1 |
| IHC_LIST | IHC1, IHC2 |

WMUM OF IHC3

FIG. 23

| IHC | IHC1 |
|---|---|
| BSSID | 1 |
| SHARE_PERIOD | 40 |
| SHARE_MODE | 1 |
| SHARE_SLOT | 0 |
| SHARE_PERIOD_START | Timer set A |
| SHARE_PERIOD_START_BSSID | 1 |
| IHC_LIST | IHC3 |

FIG. 24

| IHC | IHC2 |
|---|---|
| BSSID | 1 |
| SHARE_PERIOD | 30 |
| SHARE_MODE | 1 |
| SHARE_SLOT | 0 |
| SHARE_PERIOD_START | Timer set B |
| SHARE_PERIOD_START_BSSID | 2 |
| IHC_LIST | IHC3 |

FIG. 25

| IHC | IHC3 |
|---|---|
| BSSID | 3 |
| SHARE_PERIOD | 30 |
| SHARE_MODE | 2 |
| SHARE_SLOT | 1 |
| SHARE_PERIOD_START | Timer set A |
| SHARE_PERIOD_START_BSSID | 1 |
| IHC_LIST | IHC1, IHC2 |

WMUM OF IHC3

IHC1 AND IHC2 PRIORITIZED

| IHC | IHC1 |
|---|---|
| BSSID | 1 |
| SHARE_PERIOD | 30 |
| SHARE_MODE | 1 |
| SHARE_SLOT | 0 |
| SHARE_PERIOD_START | Timer set A |
| SHARE_PERIOD_START_BSSID | 1 |
| IHC_LIST | IHC3 |

| IHC | IHC2 |
|---|---|
| BSSID | 2 |
| SHARE_PERIOD | 30 |
| SHARE_MODE | 1 |
| SHARE_SLOT | 0 |
| SHARE_PERIOD_START | Timer set A |
| SHARE_PERIOD_START_BSSID | 1 |
| IHC_LIST | IHC3 |

WMUM OF IHC1

WMUM OF IHC2

| IHC | IHC1 |
|---|---|
| BSSID | 1 |
| SHARE_PERIOD | 40 |
| SHARE_MODE | 2 |
| SHARE_SLOT | 0 |
| SHARE_PERIOD_START | Timer set A |
| SHARE_PERIOD_START_BSSID | 1 |
| IHC_LIST | IHC2, IHC3 |

WMUM OF IHC1

| IHC | IHC2 |
|---|---|
| BSSID | 2 |
| SHARE_PERIOD | 40 |
| SHARE_MODE | 2 |
| SHARE_SLOT | 1 |
| SHARE_PERIOD_START | Timer set A |
| SHARE_PERIOD_START_BSSID | 1 |
| IHC_LIST | IHC1, IHC3 |

FIG. 36
WMUM OF IHC2
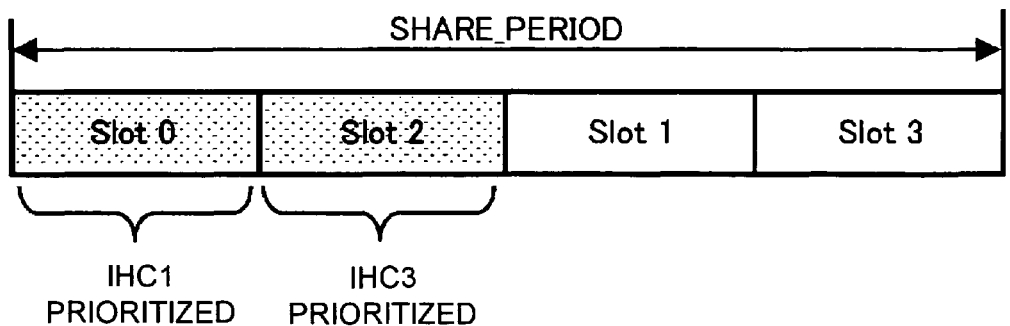
FIG. 37
| IHC | IHC3 |
|---|---|
| BSSID | 3 |
| SHARE_PERIOD | 40 |
| SHARE_MODE | 2 |
| SHARE_SLOT | 2 |
| SHARE_PERIOD_START | Timer set A |
| SHARE_PERIOD_START_BSSID | 1 |
| IHC_LIST | IHC1, IHC2 |
FIG. 38
WMUM OF IHC3
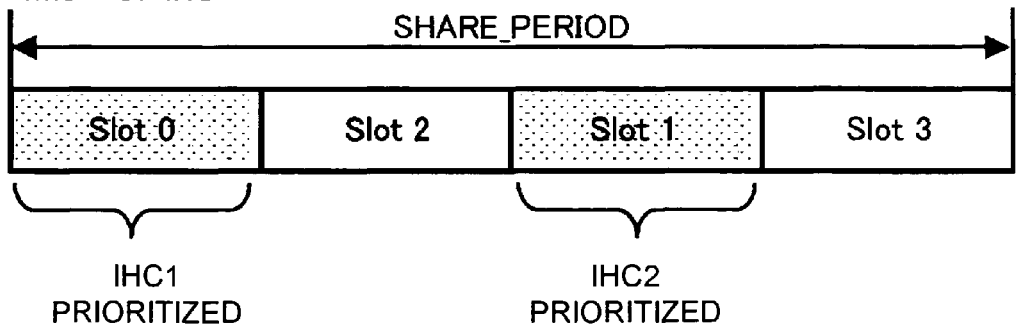

| IHC | IHC1 |
|---|---|
| BSSID | 1 |
| SHARE_PERIOD | 40 |
| SHARE_MODE | 1 |
| SHARE_SLOT | 1 |
| SHARE_PERIOD_START | Timer set A |
| SHARE_PERIOD_START_BSSID | 1 |
| IHC_LIST | IHC3 |

| IHC | IHC3 |
|---|---|
| BSSID | 3 |
| SHARE_PERIOD | 40 |
| SHARE_MODE | 1 |
| SHARE_SLOT | 0 |
| SHARE_PERIOD_START | Timer set A |
| SHARE_PERIOD_START_BSSID | 1 |
| IHC_LIST | IHC1 |

| IHC | IHC1 |
|---|---|
| BSSID | 1 |
| SHARE_PERIOD | 40 |
| SHARE_MODE | 1 |
| SHARE_SLOT | 0 |
| SHARE_PERIOD_START | Timer set A |
| SHARE_PERIOD_START_BSSID | 1 |
| IHC_LIST | PC/HC |

| IHC | IHC1 |
|---|---|
| BSSID | 1 |
| SHARE_PERIOD | 40 |
| SHARE_MODE | 3 |
| SHARE_SLOT | 3 |
| SHARE_PERIOD_START | Timer set A |
| SHARE_PERIOD_START_BSSID | 1 |
| IHC_LIST | IHC2, IHC4, ... |

| IHC | IHC2 |
|---|---|
| BSSID | 2 |
| SHARE_PERIOD | 40 |
| SHARE_MODE | 3 |
| SHARE_SLOT | 1 |
| SHARE_PERIOD_START | Timer set A |
| SHARE_PERIOD_START_BSSID | 1 |
| IHC_LIST | IHC1, IHC4, ... |

FIG. 50
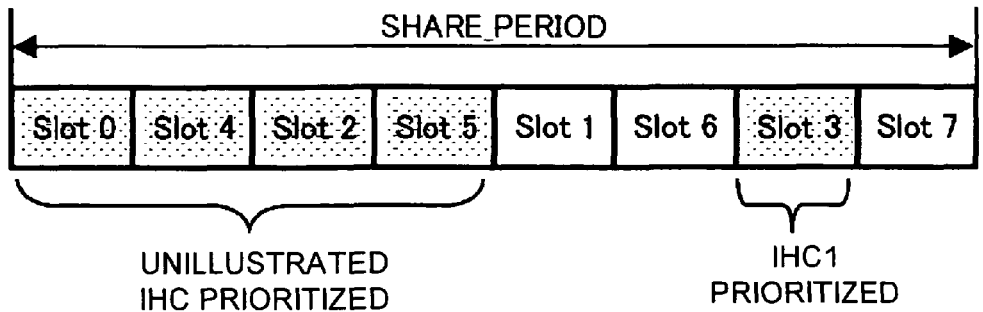
FIG. 51
| IHC | IHC3 |
|---|---|
| BSSID | 3 |
| SHARE_PERIOD | 40 |
| SHARE_MODE | 1 |
| SHARE_SLOT | 0 |
| SHARE_PERIOD_START | Timer set A |
| SHARE_PERIOD_START_BSSID | 1 |
| IHC_LIST | IHC4 |
FIG. 52
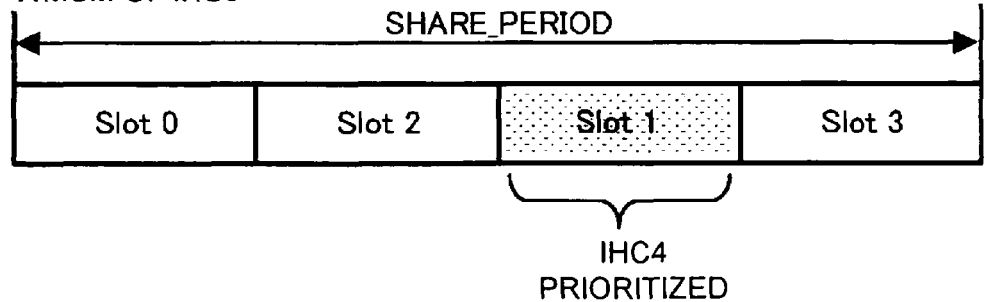

| IHC | IHC4 |
|---|---|
| BSSID | 4 |
| SHARE_PERIOD | 40 |
| SHARE_MODE | 3 |
| SHARE_SLOT | 6 |
| SHARE_PERIOD_START | Timer set A |
| SHARE_PERIOD_START_BSSID | 1 |
| IHC_LIST | IHC1, IHC2, IHC3 |

RADIO COMMUNICATION METHOD AND RADIO COMMUNICATION DEVICE

TECHNICAL FIELD

The present invention relates to a radio communication method and device for a radio communication system, which is composed of a plurality of radio communication devices in such a manner that radio communication devices other than a given radio communication device exist within the communication area (also called communication range below) of the given radio communication device.

BACKGROUND ART

The standardization of IEEE802.11e is currently developing as an extension of the IEEE802.11 standard (see the following non-patent document 1). The IEEE802.11e standard adds HCF (Hybrid Coordination Function) and defines HC (Hybrid Coordinator). The HCF is extended by combining DCF (Distributed Coordination Function) and PCF (Point Coordination Function) to have QoS (Quality of Service) specific mechanisms and frame subtypes which enable frame exchange sequences for QoS transmission between CP (Contention Period) and CFP (Contention Free Period).

The HC operates based on different rules from those for PC (Point Coordinator) in PCF. The HC coexists with a QoS enhanced access point (QAP: Quality enhanced Access Point) in QBSS (QoS Basic Service Set). The HC uses high access priority to a wireless medium of a PC to start a frame exchange sequence in order to give a controlled access phase (CAP) of a predetermined period for transfer of QoS data. Thus, the HC assigns transmit opportunities (TXOP) to QoS enhanced stations (QSTA) that are not access points. Access is prioritized by each period of waiting time during which an idle physical channel is being detected. A normal terminal needs to wait for a period equivalent to DIFS (DCF Interframe Space). On the other hand, the HC uses as the waiting time a period equivalent to PIFS (PCF Interframe Space) usually shorter than the DIFS.

Non-patent document 1: IEEE Std 802.11e/D4.2, February 2003 (Draft Supplement to IEEE Std 802.11, 1999 Edition).

However, there exists no process for controlling the operation of an HC under circumstances where QBSSs overlap. For example, if two HCs share the same time on a wireless medium, both HCs may try to access the wireless medium at the same time. After a signal collision occurs due to simultaneous access, both of the HCs wait for the same time period (PIFS). After that, they will try to access at the same time again, causing a recollision. Such a process may persist endlessly.

Thus, the conventional art has a problem in that an HC is not aware of or cannot make an effective response to the existence of any other HC, for example, when QBSSs are overlapping. There is also another problem in that if two or more HCs try to access a wireless medium, transmission from the HCs may collide repeatedly and intermittently.

DISCLOSURE OF THE INVENTION

In order to solve the above-mentioned problems, it is an object of the present invention to provide a radio communication method and device capable of avoiding a signal collision in a wireless medium to improve communication throughput.

In order to attain the above object, the present invention provides a radio communication method for a radio communication system, which is composed of a plurality of radio communication devices in such a manner that radio communication devices other than a given radio communication device exist within the communication area of the given radio communication device, wherein a time slot is assigned to the given radio communication device periodically so that it can access a wireless medium in the time slot at higher priority than the other radio communication devices.

This can provide the radio communication device with a time slot in which it can access the wireless medium at high access priority, so that any signal collision in the wireless medium is avoided, thereby improving communication throughput.

In another aspect of the present invention, the radio communication method is such that a different time slot is assigned to each radio communication device.

This allows the assignment of a different time slot to each radio communication device so that the radio communication device will access the wireless medium at high priority in the assigned time slot.

In still another aspect of the present invention, the radio communication method is such that communication time on the wireless medium is divided into time slots of equal length, and the divided time slots are assigned to respective radio communication devices.

This allows the equal distribution of a time slot to each radio communication device so that the radio communication device will access the wireless medium at high priority in the distributed time slot.

In yet another aspect of the present invention, the radio communication method is such that the number of time-slot divisions is decided based on the number of other radio communication devices existing in the communication area.

This can bring the communication mode into flexible correspondence with a time slot in which access priority to the wireless medium is high based on the number of radio communication devices.

In still another aspect of the present invention, the radio communication method is such that the given radio communication device detects the number of other radio communication devices existing in the communication area, and sends information on the number of other radio communication devices to the other radio communication devices.

This allows the radio communication device to notify the number of radio communication devices existing on the periphery (communication environment of the radio communication device) to the other radio communication devices.

In yet another aspect of the present invention, the radio communication method is such that the given radio communication device receives information related to the number of other radio communication devices from the other radio communication devices, and decides on the number of time-slot divisions based on the number of other radio communication devices existing in the communication area and the number of other radio communication devices existing in the communication area.

This allows the radio communication device to decide on the number of time-slot divisions in consideration of the number of radio communication devices existing on the periphery (communication environment of the radio communication device) and the number of radio communication devices existing around the other radio communication devices (communication environments of the other radio communication devices).

In yet another aspect of the present invention, the radio communication method is such that the other radio communication devices are specific radio communication devices.

This can target a communication control function, for example, HC, PC, or AP, to avoid a signal collision in the wireless medium, thereby improving communication throughput.

In yet another aspect of the present invention, the radio communication method is such that the given radio communication device sends information for identifying the assigned time slot so that the other radio communication devices receiving the information can select, based on the information, respective time slots different from the time slot assigned to the given radio communication device.

This allows the radio communication device to notify the other radio communication devices of the time slot in which it can access the wireless medium at high priority so that the radio communication devices receiving this notification can select respectively suitable time slots as necessary.

In yet another aspect of the present invention, the radio communication method is such that the given radio communication device accesses the wireless medium in the assigned time slot using a waiting time shorter than those for the other radio communication devices.

This allows the radio communication device to increase the possibility to access the wireless medium in the time slot in which it has high priority to access the wireless medium, thereby reducing the chances for the other radio communication devices to enter the wireless medium during the time slot.

In yet another aspect of the present invention, the radio communication method is such that the given radio communication device accesses the wireless medium in time slots other than the assigned time slot using a waiting time longer than those for the other radio communication devices.

This allows the radio communication device to decrease the possibility to access the wireless medium in time slots other than the time slot in which it has high priority to access the wireless medium, thus ensuring the equalization of the radio communication devices throughout the radio communication system.

In yet another aspect of the present invention, the radio communication method is such that a common periodic length is set among the radio communication devices so that the common period will be divided into the time slots.

This allows the standardization of the reference time length to be divided into a plurality of time slots so that predetermined time slots appear periodically throughout the radio communication system.

In yet another aspect of the present invention, the radio communication method is such that the common period is synchronized among the radio communication devices.

This allows the synchronization of time slots, thereby improving the communication efficiency of the entire radio communication system.

In yet another aspect of the present invention, the radio communication method is such that when an overlap occurs among time slots assigned to the radio communication devices, different time slots are reassigned to all but the given radio communication device so that only the given radio communication device will be assigned the time slot.

Therefore, when an overlap occurs among time slots assigned to the radio communication devices, an adjustment is made not to assign the same time slot to different radio communication devices, enabling a reduction in signal collision in the wireless medium.

In yet another aspect of the present invention, the radio communication method is such that when the given radio communication device is shut down, the time slots are reassigned so that the other radio communication devices will have chances of using the time slot assigned to the given radio communication device.

This allows the efficient assignment of time slots, thus improving communication throughput.

In order to attain the above object, the present invention also provides a radio communication method implemented by a given radio communication device, wherein the given radio communication device detects the number of other radio communication devices existing within the communication area of the given radio communication device, and sends information on the number of other radio communication devices to the other radio communication devices.

This allows the radio communication device to notify the other radio communication devices of the number of detectable radio communication devices existing on the periphery (communication environment of the radio communication device).

Further, in order to attain the above object, the present invention provides a radio communication method implemented by a given radio communication device, wherein the given radio communication device receives, from other radio communication devices, information on the number of radio communication devices existing within the communication areas of the other radio communication devices.

This allows the radio communication device to grasp the number of radio communication devices existing around the other radio communication devices (communication environments of the other radio communication devices).

Further, in order to attain the above object, the present invention provides a radio communication device in whose communication area any other radio communication device may exist, wherein the radio communication device is constructed in a manner to detect the number of other radio communication devices existing in the communication area and send information on the number of other radio communication devices to the other radio communication devices.

This structure allows the radio communication device to notify the other radio communication devices of the number of detectable radio communication devices existing on the periphery (communication environment of the radio communication device).

Further, in order to attain the above object, the present invention provides a radio communication device in whose communication area any other radio communication device may exist, wherein the radio communication device is constructed in a manner to receive, from the other radio communication devices, information on the number of radio communication devices existing in the communication areas of the other radio communication devices.

This structure allows the radio communication device to grasp the number of radio communication devices existing around the other radio communication devices (communication environments of the other radio communication devices)

Further, in order to attain the above object, the present invention provides a radio communication device in whose communication area any other radio communication device may exist, wherein the radio communication device is constructed in a manner to detect the number of other radio communication devices existing in the communication area, receive from the other radio communication devices information on the number of radio communication devices existing in the communication areas of the other radio communication devices, and create parameters for dividing communication time on a wireless medium into time slots of equal length based on the number of radio communication devices detected and the number of radio communication devices received from the other radio communication devices.

This structure allows the radio communication device to make settings related to time slots dividing the wireless medium in consideration of the number of radio communication devices existing on the periphery (communication environment of the radio communication device) and the number of radio communication devices existing around the other radio communication devices (communication environments of the other radio communication devices).

In another aspect of the present invention, the radio communication device is constructed in a manner to select one of the time slots and use the selected one as the time slot in which the device can access the wireless medium at higher priority than the other radio communication devices.

This structure allows the setting of a time slot in which the radio communication device can access the wireless medium at high priority.

In still another aspect of the present invention, the radio communication device is constructed in a manner to send the other radio communication devices information for identifying the selected time slot.

This structure allows the radio communication device to notify the other radio communication devices of the time slot in which in which the radio communication device can access the wireless medium at high priority.

In yet another aspect of the present invention, the radio communication device is constructed in a manner to receive, from the other radio communication devices, information for identifying time slots selected by the other radio communication devices.

This structure allows the radio communication device to find the time slots in which the other radio communication devices access the wireless medium at high priorities.

In yet another aspect of the present invention, the radio communication device is constructed in such a manner that when the selected time slot overlaps with a time slot selected by any of the other radio communication devices, it refers to predetermined conditions to determine whether to reselect the time slot.

This structure allows either of the radio communication devices that have overlapped each other to reselect a time slot.

In yet another aspect of the present invention, the radio communication device is constructed in such a manner that when reselection was performed, it sends the other radio communication devices information for identifying the reselected time slot.

This structure allows the radio communication device to notify the other radio communication devices of the reselected time slot.

In yet another aspect of the present invention, the radio communication device is constructed in a manner to set the length and start timing of time cycle and divide the time cycle by the time slot.

This structure allows predetermined time slots to appear periodically.

In yet another aspect of the present invention, the radio communication device is constructed in a manner to send the other radio communication devices information on the length and start timing of the time cycle.

This structure allows the radio communication device to notify the other radio communication devices of information for synchronizing time slots.

In yet another aspect of the present invention, the radio communication device is constructed in a manner to receive, from the other radio communication devices, information on the length and start timing of the time cycle.

This structure allows the radio communication device to receive, from the other radio communication devices, information for synchronizing time slots.

In yet another aspect of the present invention, the radio communication device is constructed in a manner to reconcile the length and start timing of the time cycle with those set by the other radio communication devices.

This structure allows the synchronization of time slots, thereby improving the communication efficiency of the entire radio communication system.

In yet another aspect of the present invention, the radio communication device is constructed in a manner to access the wireless medium in the selected time slot using a waiting time shorter than those for the other radio communication devices.

This structure allows the radio communication devices to increase the possibility to access the wireless medium in the time slot in which it has high priority to access the wireless medium, thereby reducing the chances for the other radio communication devices to enter the wireless medium during the time slot.

In yet another aspect of the present invention, the radio communication device is constructed in a manner to access the wireless medium in time slots other than the selected time slot using a waiting time longer than those for the other radio communication devices.

This structure allows the radio communication device to decrease the possibility to access the wireless medium in time slots other than the time slot in which it has high priority to access the wireless medium, thus ensuring the equalization of the radio communication devices throughout the radio communication system.

BRIEF DESCRIPTION OF THE DRAWINGS

FIG. 4 is a flowchart showing the outline of communication initiation processing in an IHC according to the present invention;

FIG. 23 shows parameters set in step S2102 shown in FIG. 19;

FIG. 24 shows parameters set in step S2202 shown in FIG. 19;

FIG. 25 shows parameters set in step S2306 shown in FIG. 19;

FIG. 36 shows a WMUM held together with the parameters shown in FIG. 35;

FIG. 37 shows parameters set in step S3301 shown in FIG. 32;

FIG. 38 shows a WMUM held together with the parameters shown in FIG. 37;

FIG. 50 shows a WMUM held by the IHC2 shown in FIG. 46;

FIG. 51 shows parameters set by IHC3 shown in FIG. 46;

FIG. 52 shows a WMUM held by the IHC3 shown in FIG. 46;

BEST MODES FOR CARRYING OUT THE INVENTION

Preferred embodiments of a radio communication method and device of the present invention will now be described with reference to the accompanying drawings. The present invention proposes such a mechanism that an HC detects other HCs, which operate near the HC and share a wireless medium with the HC, to allow the HC to share the wireless medium equally with the other HCs detected. In the following, a new HC (radio communication device of the present invention) performing such an operation is called IHC (Inter-working Hybrid Coordinator) to make the explanation clear.

New parameters used in a radio communication system according to the present invention will first be described. It is preferable that these new parameters be included in new Inter-working (interconnection) fields defined in a management frame in the IEEE802.11e standard.

Figures 1, 2:
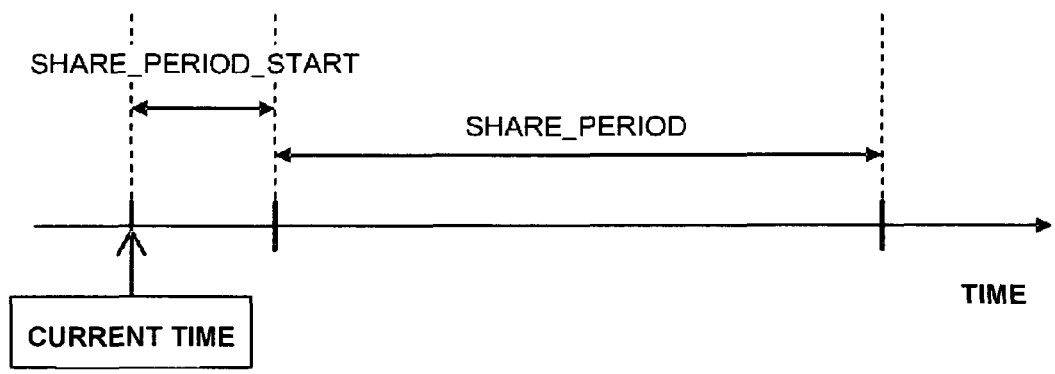
FIG. 1 is a table for explaining parameters used in a radio communication system according to the present invention.
FIG. 2 is a diagram for explaining parameters related to time used in the radio communication system according to the present invention.

FIG. 1 is a table for explaining parameters used in the radio communication system according to the present invention. FIG. 1 shows SHARE_MODE parameters, numbers of slots, and SHARE_SLOT durations, all set according to the number of other IHCs, respectively. The number of other IHCs means the number of IHCs sharing the same wireless medium with a given IHC. In other words, the wireless medium is shared among IHCs the total number of which is "the number of other IHCs plus one."

The SHARE_MODE parameter is used to denote the number of time slots (also described simply as slots) defined by dividing a beacon period. The SHARE_SLOT parameter is the identifier of each time slot. In a time slot selected by this IHC, the IHC is given high priority to access the wireless medium.

FIG. 2 is a diagram for explaining parameters related to time used in the radio communication system according to the present invention. The SHARE_PERIOD parameter is a time length for arbitration among IHCs in an environment where QBSSs are overlapping. This parameter is an independent variable which can be stored in a management information base. The SHARE_PERIOD_START parameter denotes a time period from the time of receiving the first symbol in this frame (current time) until the next SHARE_PERIOD starts. It can also be called SHARE_PERIOD offset time. This SHARE_PERIOD is used to calculate the start time of SHARE_PERIOD for synchronization of SHARE_PERIODs.

SHARE_PERIOD_START_BSSID parameter denotes BSSID (MAC address of IHC) from which the value of SHARE_PERIOD_START parameter is obtained. In the embodiment, the BSSID is used as identification information on each IHC, but such identification information is not limited to the BSSID. Other kinds of identification information can be used (including temporarily assigned information). IHC_LIST is a list of other IHCs (including HCs and PCs) sharing the wireless medium with the IHC.

Note that the IHC needs to hold a WMUM (Wireless Medium Usage Map). This map includes and updates information based on reservations about the wireless medium made by other IHCs (information on a time slot in which each IHC is given access priority). The WMUM may also hold information on its own device reservation in addition to the information related to the other IHCs.

Figure 3A:
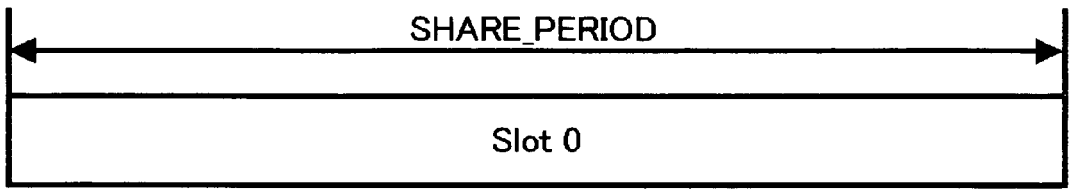
FIG. 3A is a schematic diagram showing the division of communication time in SHARE_MODE=0 on a wireless medium according to the present invention.
Figure 3B:
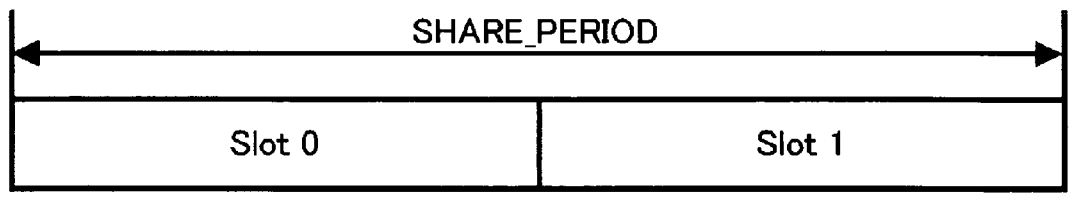
FIG. 3B is a schematic diagram showing the division of communication time in SHARE_MODE=1 on the wireless medium according to the present invention.
Figure 3C:
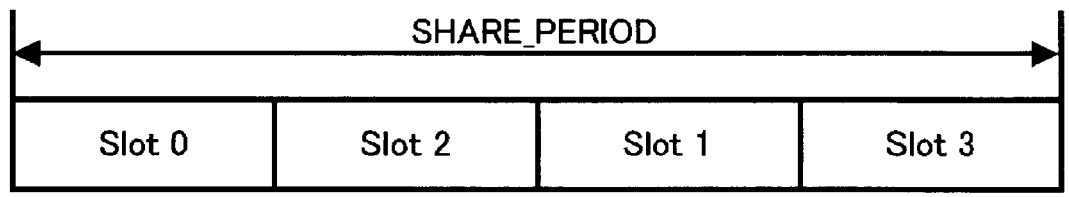
FIG. 3C is a schematic diagram showing the division of communication time in SHARE_MODE=2 on the wireless medium according to the present invention.
Figure 3D:
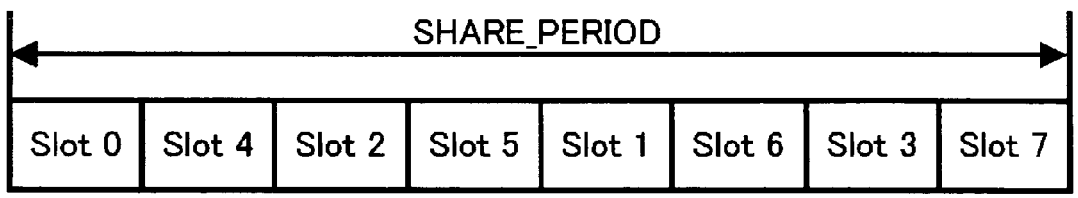
FIG. 3D is a schematic diagram showing the division of communication time in SHARE_MODE=3 on the wireless medium according to the present invention.
Figure 3E:
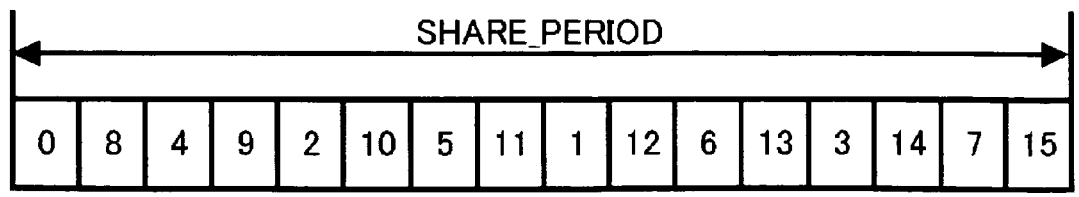
FIG. 3E is a schematic diagram showing the division of communication time in SHARE_MODE=4 on the wireless medium according to the present invention.

FIGS. 3A to 3E are schematic diagrams showing the division of communication time on the wireless medium according to the present invention. FIG. 3A shows the division in SHARE_MODE=0, FIG. 3B shows the division in SHARE_MODE=1, FIG. 3C shows the division in SHARE_MODE=2, FIG. 3D shows the division in SHARE_MODE=3, and FIG. 3E shows the division in SHARE_MODE=4.

The communication time on the wireless medium is divided into time slots at large. The duration of each time slot is variable depending on the values of the SHARE_PERIOD parameter and the SHARE_MODE parameter. For example, the time slot is created by dividing the SHARE_MODE parameter value by a factor ($2^{SHARE\_MODE}$) that is a power of 2. This is effective when a new IHC goes online and an IHC that is already online is requested from the new IHC to share the wireless medium. Common rules are provided in the numbering of time slots so that all IHCs will be numbered in the same manner. The start timings of time slots sharing the same number are not affected by the total number of usable time slots (which depends on the SHARE_MODE parameter).

The following description provides a general outline of the operation of the IHC. The IHC decides on a time slot in which it operates at higher access priority so that it will not overlap the other IHCs. The IHC uses SPIFS (Shorter PIFS) (<PIFS), as defined in the present invention, at the time of access to the wireless medium in the time slot in which it operates at higher priority, while the IHC uses LPIFS (Longer PIFS) (>PIFS), as defined in the present invention, in the other time slots.

SPIFS is longer than SIFS, but shorter than PIFS. LPIFS is longer than PIFS, but shorter than DIFS. Each length can be set discretionarily as long as it meets the following relationship: SIFS<SPIFS<PIFS<LPIFS<DIFS. As defined under IEEE802.11e, PIFS is equivalent to HCAIFS (1.0), SPIFS corresponds to HCAIFS (0.5), and LPIFS corresponds to HCAIFS (1.5). It is feasible that SPIFS will be replaced by HCAIFS (m, where 0<m<1.0) and LPIFS by HCAIFS (n, where 1.0<n<2.0).

Thus, the IHC is more likely to get access to the wireless medium using SPIFS in the assigned time slot, while the other IHCs reduce their chances of entering the wireless medium during the time slot. However, it should be noted that the IHC or HC can get access to the wireless medium using a predetermined time length (e.g., LPIFS or PIFS) in a time slot assigned to any other IHC, that is, it can still use the time slot, regardless of a preferable time slot assigned to the IHC or HC, as long as the wireless medium is available.

FIG. 4 is a flowchart showing the outline of communication initiation processing in the IHC according to the present invention. The IHC first goes online (step S101) and determines whether any other active IHC exists on the wireless medium (step S102). The other active IHCs can be detected from frames existing on the wireless medium.

If no other IHCs exist, the IHC sets each parameter to default as follows (step S103):
  Set SHARE_MODE parameter to 0.
  Set SHARE_SLOT parameter to 0.
  Set SHARE_PERIOD parameter to default.
  Set SHARE_PERIOD_START parameter to any value.
  Set SHARE_PERIOD_START_BSSID parameter to the BSSID of the IHC.

On the other hand, if any other active IHC exists, the IHC executes the following steps: The IHC updates IHC_LIST (step S104) and sends the other IHCs a management frame with all variables in the Inter-working field set to 0 (step S105).

Then the IHC sets SHARE_PERIOD parameter to a value for the shortest one of the already-active IHCs (including the host) (step S106). Further, it sets SHARE_PERIOD_START_BSSID parameter to the smallest BSSID of received BSSIDs and host BSSID (step S107). Further, it sets SHARE_PERIOD_START parameter to a value given by an IHC having the smallest BSSID (step S108). Further, it decides on and sets SHARE_MODE parameter to a value according to the number of other active IHCs (step S109). Further, it selects a value for SHARE_SLOT parameter so that the selected time slot will have the lowest available number (step S110). Note that the SHARE_SLOT parameter is decided on according to the SHARE_MODE parameter and the WMUM.

Figure 5:
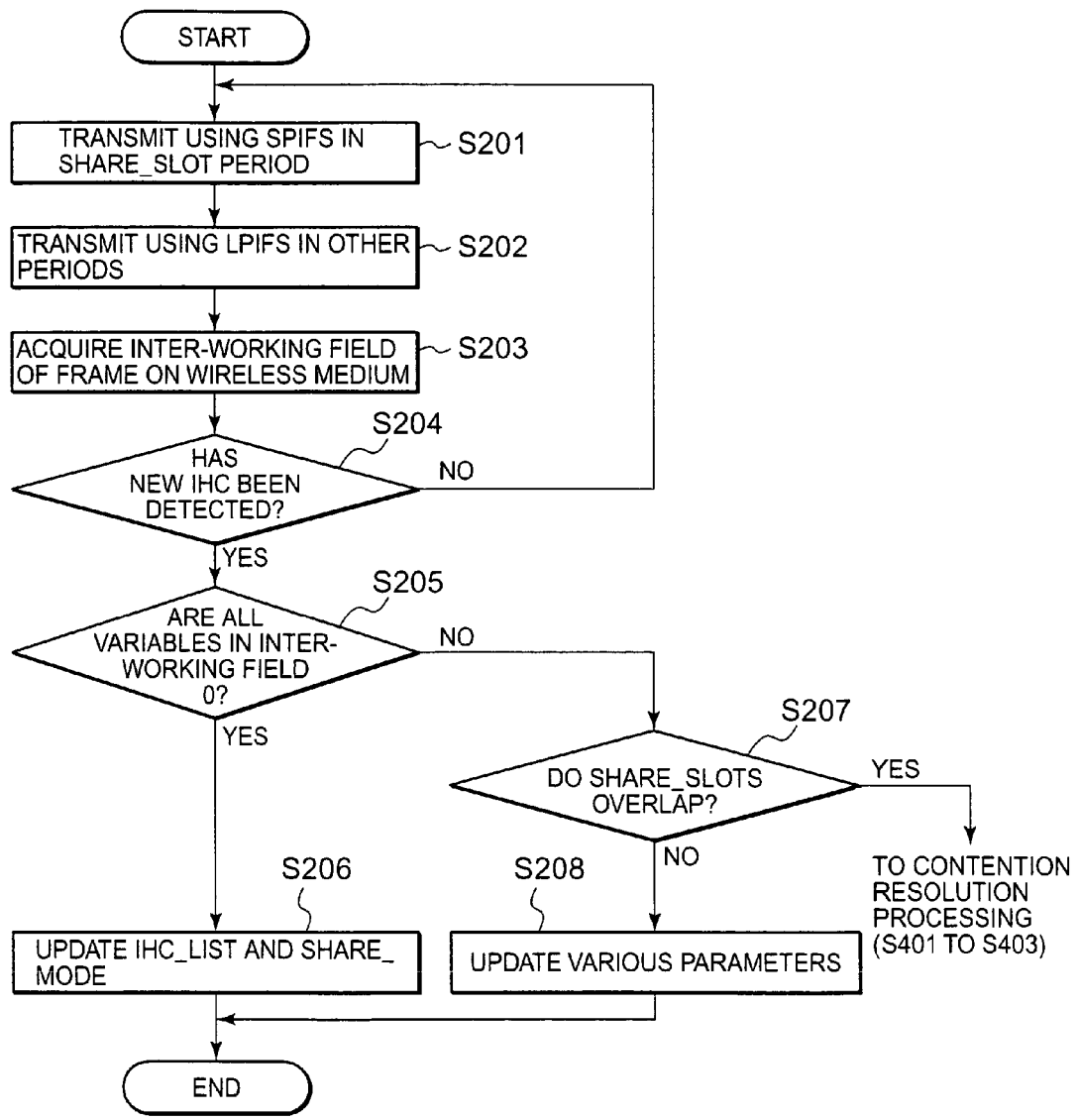
FIG. 5 is a flowchart showing the outline of normal operation processing in the IHC according to the present invention.

FIG. 5 is a flowchart showing the outline of normal operation processing in the IHC according to the present invention. After initiation of communication in FIG. 4, the IHC executes the following steps: First, the IHC uses SPIFS in a period determined from the SHARE_PERIOD parameter, the SHARE_MODE parameter, and the SHARE_SLOT parameter to start transmission after waiting for SPIFS (step S201). On the other hand, it uses LPIFS in the other periods to start transmission after waiting for LPIFS (step S202). Then, it reads all frames on the wireless medium to acquire the Inter-working fields (step S203).

Suppose that, as a result of referring to the Inter-working fields, any IHC not included in IHC_LIST is detected (YES in step S204). In this case, if all variables in the corresponding Inter-working field are 0 (YES in step S205), the IHC determines the detected IHC as a new IHC, and updates the IHC_LIST and the SHARE_MODE parameter (step S206). In addition, it readjusts the WMUM as necessary to update the parameters in the Inter-working field. If no new IHC is detected in step S204 (NO in step S204), normal communication processing as described in steps S201 to S203 is repeated.

On the other hand, if any variable(s) in the Inter-working field is not 0 (NO in step S205), and when the SHARE_SLOT parameters overlap each other (YES in step S207), contention resolution processing to be described later (in FIG. 7) is executed.

When the SHARE_SLOT parameters do not overlap each other (NO in step S207), various parameters are updated (step S208). For example, if a shorter SHARE_PERIOD (exclusive of 0) is found, the SHARE_PERIOD parameter is set to a smaller value. Further, if a smaller SHARE_PERIOD_START_BSSID parameter is found, the SHARE_PERIOD_START_BSSID parameter is set to a smaller value, and the SHARE_PERIOD_START parameter is updated as required.

Figure 6:
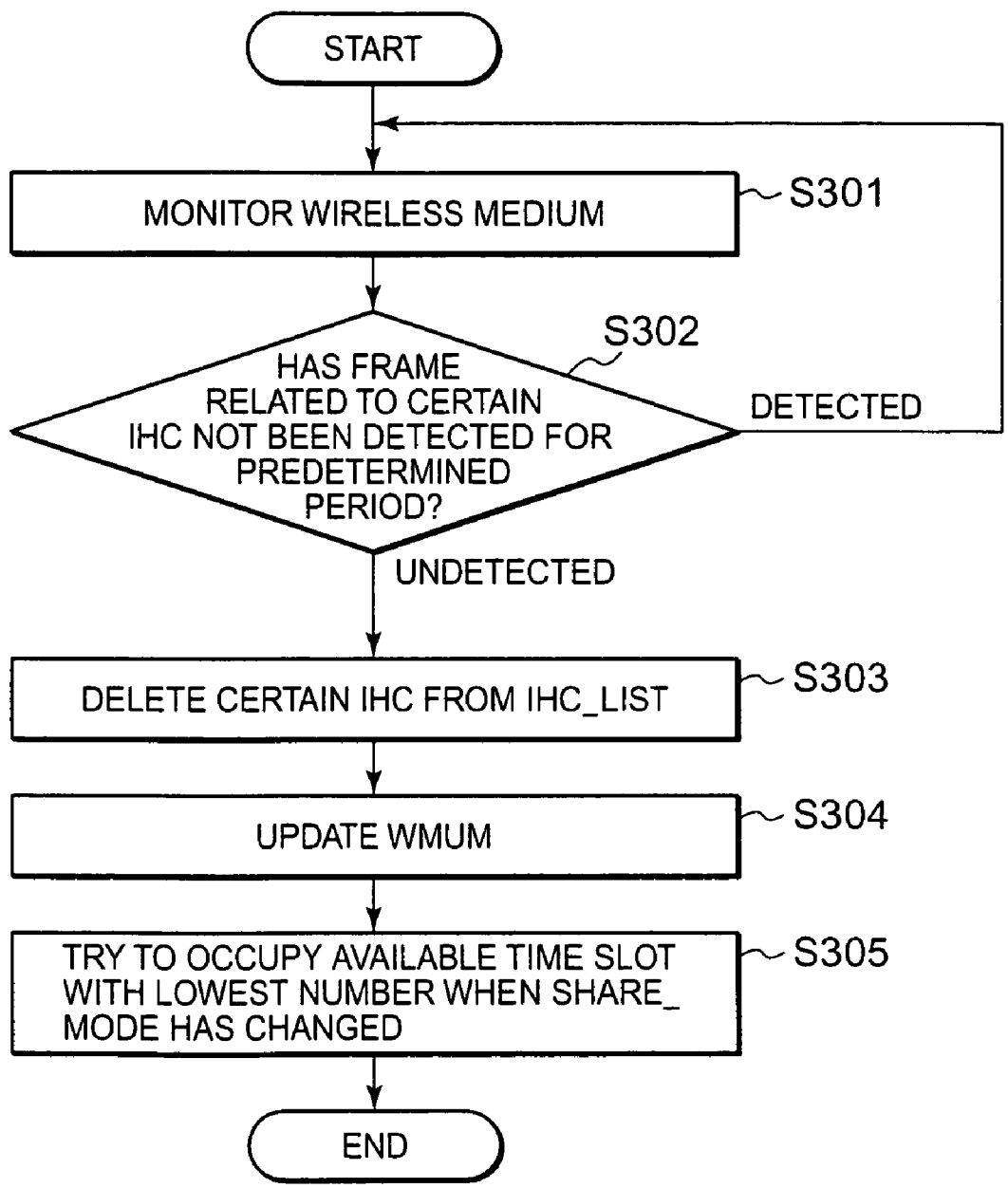
FIG. 6 is a flowchart showing the outline of shutdown processing in the IHC according to the present invention.

FIG. 6 is a flowchart showing the outline of shutdown processing in the IHC according to the present invention. This processing is executed when any other IHC goes offline. First, the IHC monitors the wireless medium constantly to acquire frames from the other IHCs existing in the IHC_LIST (step S301). Then, if any frame related to a certain IHC has not been detected for a predetermined time period (e.g., at an interval of a given number of consecutive SHARE_PERIODs) (UNDETECTED in step S302), the IHC deletes the certain IHC from the IHC_LIST (step S303) and updates the WMUM (step S304). Further, if the SHARE_MODE has changed, the IHC tries to occupy an available time slot assigned the lowest number (step S305). On the other hand, if a frame related to a certain IHC has been detected in step S302 within a predetermined period of time, the IHC considers the certain IHC to be online and repeats the monitoring of the wireless medium in step S301.

Figure 7:
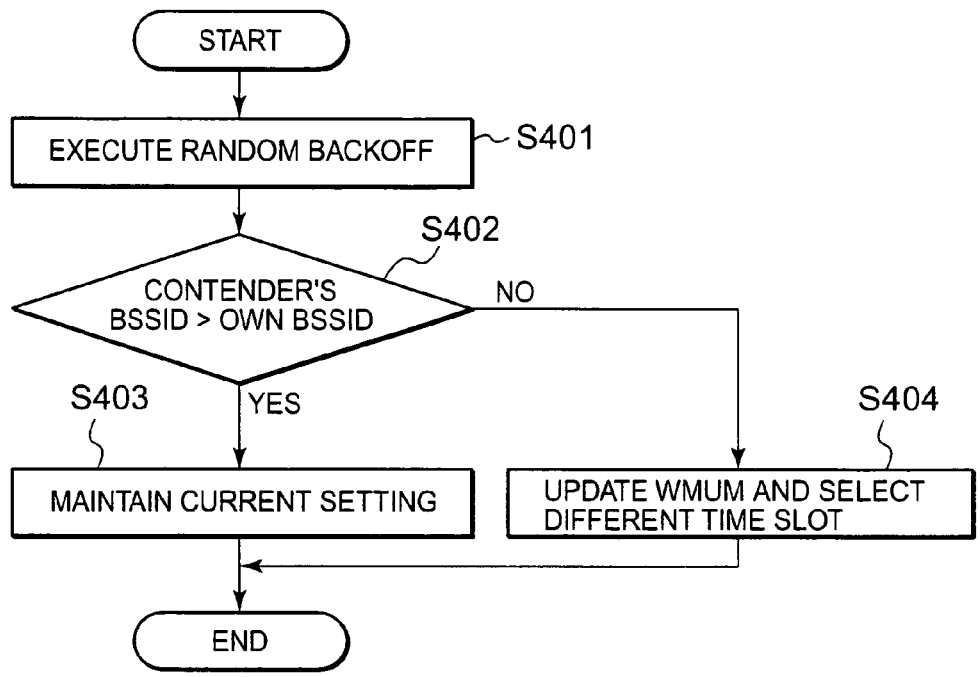
FIG. 7 is a flowchart showing the outline of contention resolution processing between IHCs according to the present invention.

FIG. 7 is a flowchart showing the outline of contention resolution processing between IHCs according to the present invention. This processing is to avoid any problem caused when SHARE_SLOT parameters overlap each other. First, when a collision occurs, the IHC performs a (short) random backoff (step S401) to avoid the collision. Then, when a contention or overlap between SHARE_SLOT parameters is detected, the IHC compares its BSSID with the BSSID of the contender (step S402). If contender's BSSID>its own BSSID, the IHC maintains the current setting (step S403), while if contender's BSSID<its own BSSID, the IHC updates the WMUM to select a different time slot (step S404).

In some cases, the IHC might have to occupy a time slot shorter than that authorized by the SHARE_MODE parameter. This might be because of, for example, a lack of consecutive free space. In such a case, the value of the SHARE_MODE parameter is increased to an appropriate value to shorten the time slot so that the best SHARE_SLOT will be selected under the circumstances.

The following specifically describes first to fifth embodiments of the present invention, which schematically show the operation of the IHC when it interacts with any other IHC or HC/PC.

FIRST EMBODIMENT

Figure 8:
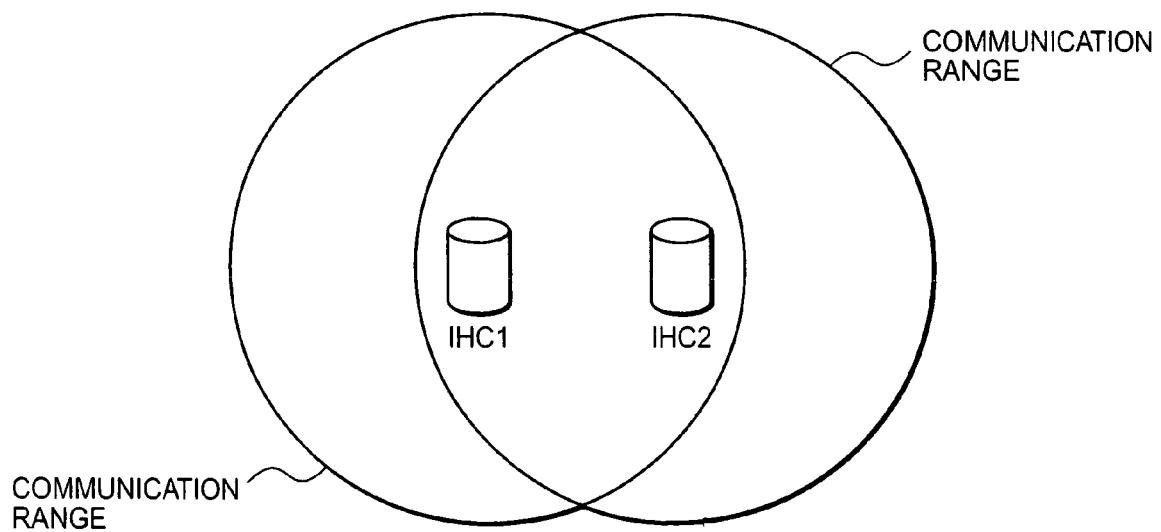
FIG. 8 is a schematic illustration showing such a state that two IHCs overlap in a first embodiment of the present invention.
Figure 9:
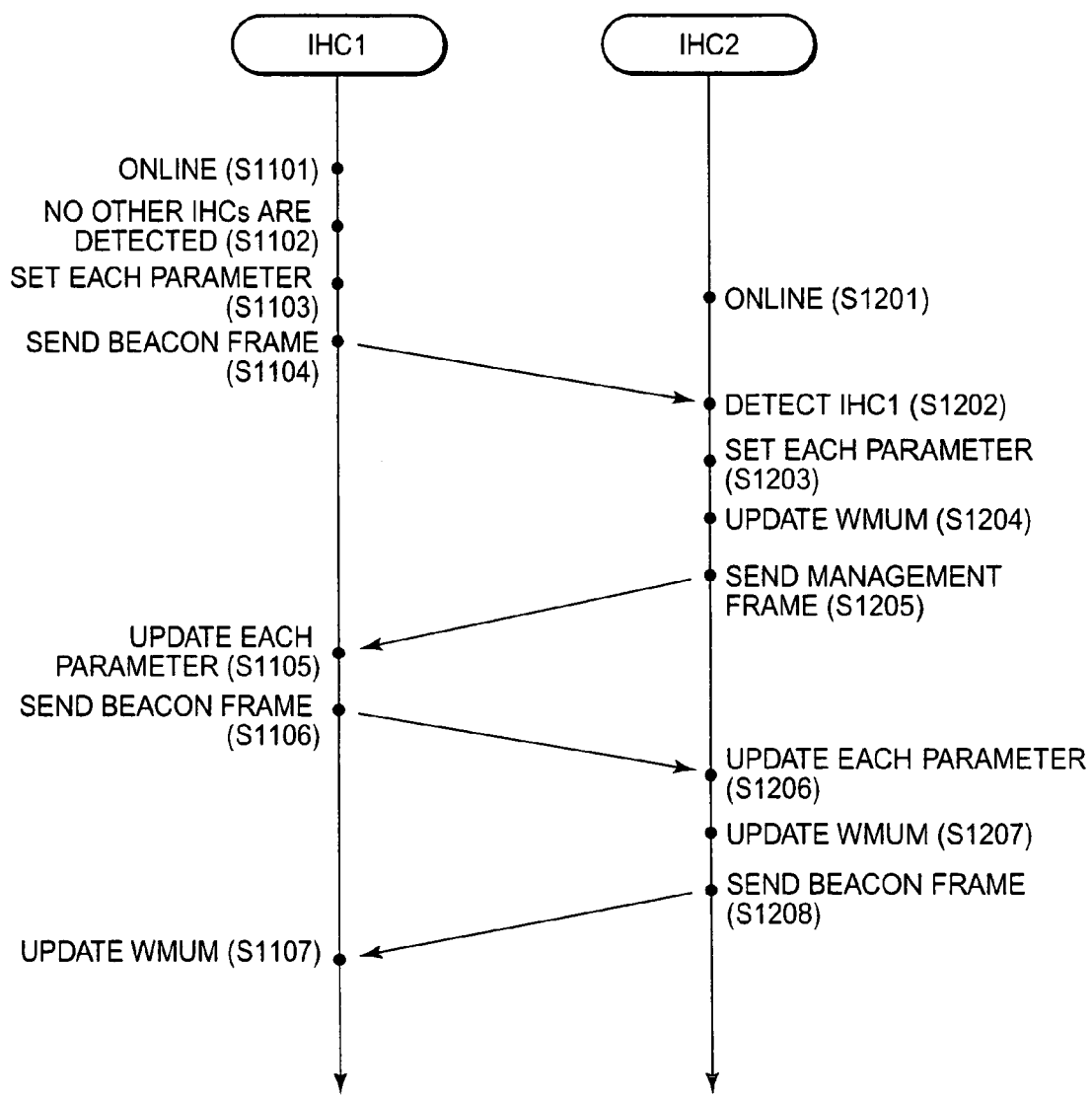
FIG. 9 is a sequence chart showing processing in each IHC in the structure shown in FIG. 8.

The first embodiment of the present invention illustrates a case where two IHCs (IHC1 and IHC2) overlap each other. FIG. 8 is a schematic illustration showing such a state that two IHCs overlap in the first embodiment of the present invention. FIG. 9 is a sequence chart showing processing in each IHC in the structure shown in FIG. 8. The processing in the structure shown in FIG. 8 will be described according to the sequence chart of FIG. 9. It is assumed that the BSSID of IHC1 is "1" and the BSSID of IHC2 is "2".

Both of IHC1 and IHC2 are online in the initial step. First, the IHC1 goes online (step S1101), and checks the communication status on the wireless medium to determine if there is any other IHC. At this moment, the IHC2 is still offline, and no IHC is detected on the wireless medium (step S1102). The IHC1 then sets each parameter as shown in FIG. 10 (step S1103).

Figures 10, 11, 12:
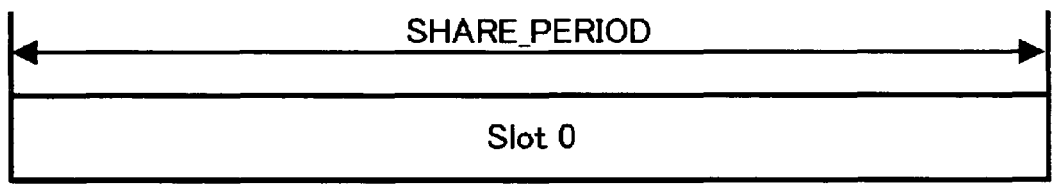
FIG. 10 shows parameters set in step S1103 shown in FIG. 9.
FIG. 11 shows a WMUM updated following the setting of parameters in FIG. 10.
FIG. 12 shows parameters set in step S1203 shown in FIG. 9.

Note that 40 (ms) set in FIG. 10 for the SHARE_PERIOD parameter is just an example and any other default value is settable. The SHARE_PERIOD_START parameter can also be set to any timing (though "Timer set A" is set here). Further, the BSSID value for the IHC1 itself is set for the SHARE_PERIOD_START_BSSID parameter. Therefore, the WMUM for the IHC1 is as shown in FIG. 11. In other words, the IHC1 can use SPIFS at all times.

The IHC1 transmits these set parameters over the wireless medium as a beacon frame as appropriate (e.g., periodically) (step S1104). The parameters that should be included at least in the beacon frame are the BSSID (identifier of IHC1), the SHARE_PERIOD_START_BSSID parameter, the SHARE_PERIOD parameter, and the SHARE_PERIOD START parameter. The sequence of operations from step S1101 to step S1103 and the periodic transmission of the beacon frame in step S1104 are collectively called an isolated online procedure below.

Next, the IHC2 goes online (step S1201) and checks the communication status on the wireless medium to determine if there is any other IHC. In this case, the IHC1 is already online, and the IHC1 is detected on the wireless medium (step S1202). The IHC2 then sets each parameter as shown in FIG. 12 (step S1203).

The parameters shown in FIG. 12 are set as follows: First, the IHC2 refers to the SHARE_PERIOD_START_BSSID parameter in the beacon frame of the IHC1 detected on the wireless medium, compares it with its own BSSID, and verifies that the SHARE_PERIOD_START_BSSID parameter is smaller than the BSSID of the IHC2. As a result, the IHC2 sets the SHARE_PERIOD_START_BSSID parameter to "1" as in the SHARE_PERIOD_START_BSSID parameter acquired from the IHC1. It also sets the SHARE_PERIOD parameter and the SHARE_PERIOD_START parameter to "40" and "Timer set A", respectively, according to the parameters set by IHC1. Further, according to the detection of the IHC1, it sets the SHARE_MODE parameter to "1" and adds the IHC1 to the IHC_LIST. Note that the SHARE_SLOT parameter does not need to be set at this stage (here, "0" (default) is set in the SHARE_SLOT parameter).

Figures 13, 14, 15:
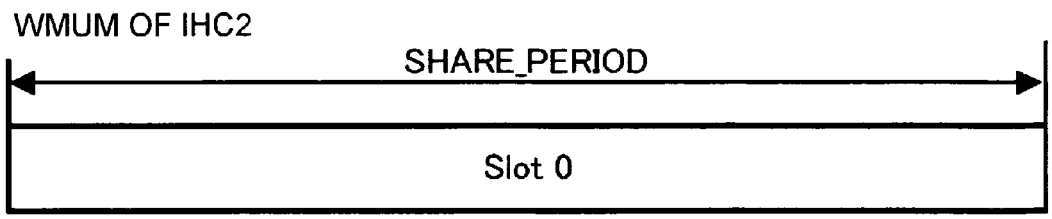
FIG. 13 shows a WMUM updated following the setting of parameters in FIG. 12.
FIG. 14 shows parameters set in step S1105 shown in FIG. 9.
FIG. 15 shows parameters set in step S1206 shown in FIG. 9.

Then the IHC2 updates the WMUM as shown in FIG. 13 (step S1204) and sends the IHC1 a management frame (having the Inter-working field in which all variables are set to 0) (step S1205). The management frame with all variables set to 0 indicates that the IHC2 is a new entry.

The IHC1 receives the management frame sent from the HC2 in step S1205 and updates each parameter as shown in FIG. 14 (step S1105). In this parameter setting, the IHC2 is added to the IHC_LIST and the SHARE_MODE parameter is set to "1". The SHARE_SLOT parameter remains as "0". Note that any other value can be selected for the SHARE_SLOT parameter within the total number of SHARE_SLOTs defined by the SHARE_MODE parameter (for example, when the SHARE_MODE parameter is "1", the total number of SHARE_SLOTs is 2). Then the IHC1 sends the IHC2 these parameters as beacon frame (step S1106).

Figure 16:
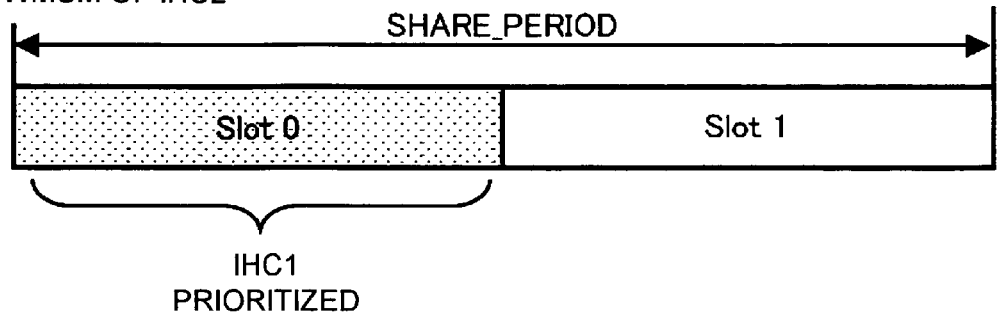
FIG. 16 shows a WMUM updated following the setting of parameters in FIG. 15.
Figure 17:
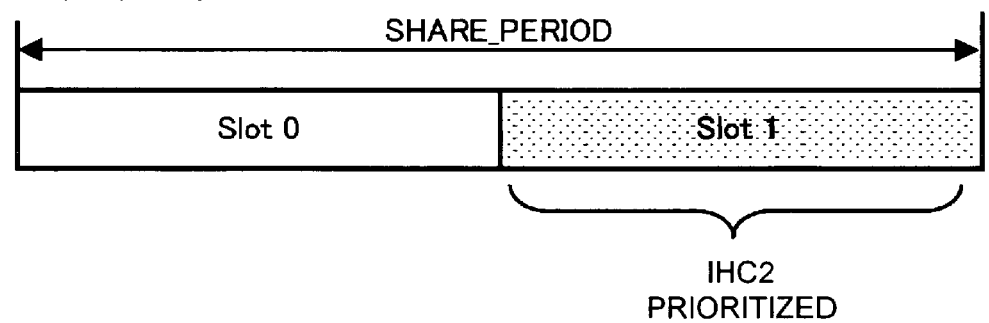
FIG. 17 shows a WMUM updated following the setting of parameters in FIG. 14.

The IHC2 receives the beacon frame sent from the IHC1 in step S1106 and updates each parameter as shown in FIG. 15 (step S1206). In this parameter setting, the SHARE_SLOT parameter is set to "1" (different from the SHARE_SLOT parameter of the IHC1). Then the IHC2 updates WMUM as shown in FIG. 16 (step S1207) and sends these set parameters through the wireless medium as a beacon frame (or management frame) so that the IHC1 will get the frame (step S1208). The IHC1 receives the beacon frame sent from the IHC2 in step S1208 and updates the WMUM as shown in FIG. 17 (step S1107).

The above-mentioned procedure enables the division of time defined by the SHARE_PERIOD parameter into time slot 0 and time slot 1. Therefore, the IHC1 and the IHC2 can be set so that the IHC1 will be assigned high priority in the time slot 0 and the IHC 2 will be assigned high priority in the time slot 1. After that, the IHC1 accesses the wireless medium using SPIFS in the time slot 0 and LPIFS in the time slot 1. On the other hand, the IHC2 accesses the wireless medium using LPIFS in the time slot 0 and SPIFS in the time slot 1.

SECOND EMBODIMENT

Figure 18:
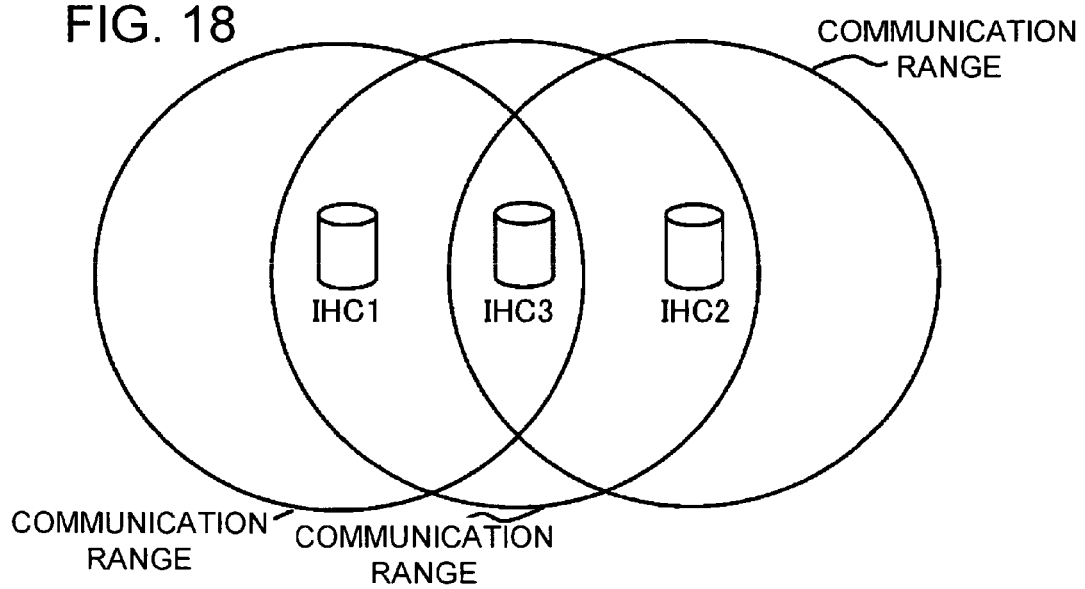
FIG. 18 is a schematic illustration showing such a state that two IHCs that do not overlap each other overlap with a common IHC in a second embodiment of the present invention.
Figure 19:
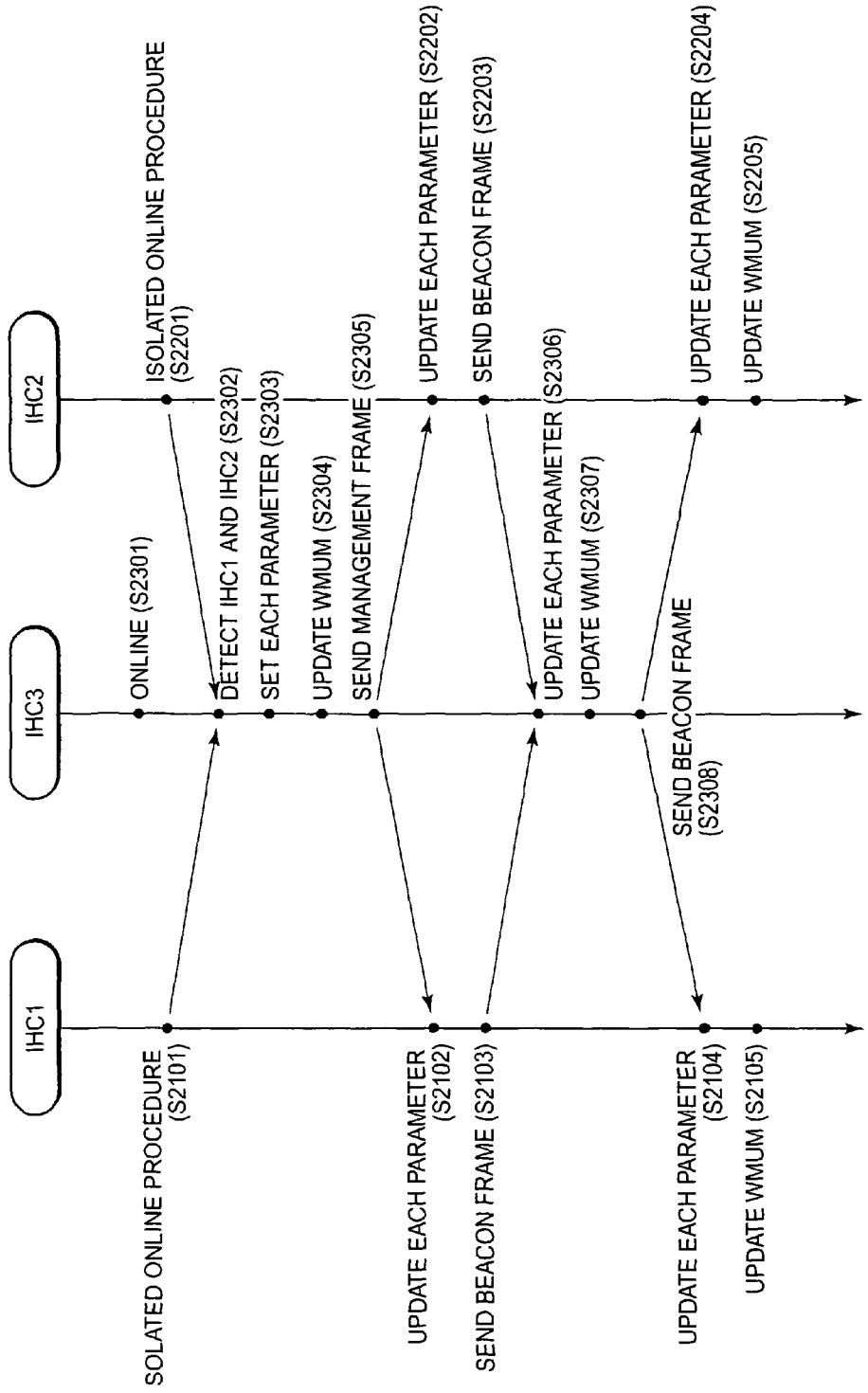
FIG. 19 is a sequence chart showing processing in each IHC in the structure shown in FIG. 18.

The second embodiment of the present invention illustrates a case where two IHCs (IHC1 and IHC2) that do not overlap each other exist and overlap with common IHC3, respectively. FIG. 18 is a schematic illustration showing such a state that two IHCs that do not overlap each other overlap with a common IHC in the second embodiment of the present invention. FIG. 19 is a sequence chart showing processing in each IHC in the structure shown in FIG. 18. The processing in the structure shown in FIG. 18 will be described according to the sequence chart of FIG. 19. It is assumed that the BSSID of IHC1 is "1", the BSSID of IHC2 is "2", and the BSSID of IHC3 is "3".

IHC1, IHC2, and IHC3 are all offline in the initial step. First, when the IHC1 goes online, the IHC1 executes the isolated online procedure (step S2101). Therefore, the IHC1 makes settings, such as to set the parameters shown in FIG. 10 and the WMUM shown in FIG. 11 as described in the first embodiment.

Next, when the IHC2 goes online, since the IHC2 cannot detect that the IHC1 is online, it executes the isolated online procedure (step S2201). Since the IHC1 and the IHC2 exist separately from each other, the IHC2 sets the parameters (FIG. 20) without any influence from the outside. The IHC1 and the IHC2 may take different values of the SHARE_PERIOD parameter ("40" for the IHC1 and "30" for the IHC2) and the SHARE_PERIOD_START parameter ("Timer set A" for the IHC1 and "Timer set B" for the HIC2).

Figures 20, 21, 22:
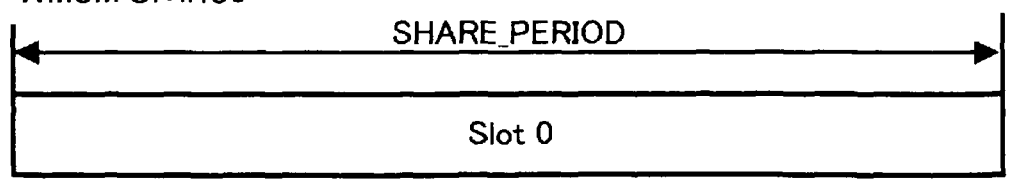
FIG. 20 shows parameters set in step S2201 shown in FIG. 19.
FIG. 21 shows parameters set in step S2303 shown in FIG. 19.
FIG. 22 shows a WMUM updated following the setting of parameters in FIG. 21.

Next, the IHC3 goes online (step S2301) and checks the communication status on the wireless medium to determine if there is any other IHC. In this case, the IHC1 and the IHC2 are already online, and the IHC3 detects both. In other words, both of the IHC1 and the IHC2 are detected on the wireless medium (step S2302). The IHC3 then sets each parameter as shown in FIG. 21 (step S2303).

In this parameter setting, the IHC3 first refers to the SHARE_PERIOD_START_BSSID parameters in the beacon frames of the IHC1 and the IHC2 detected on the wireless medium, compares them with its own BSSID, and verifies that the SHARE_PERIOD_START_BSSID parameter of the IHC1 is the smallest. As a result, the IHC3 sets the SHARE_PERIOD_START_BSSID parameter to "1" as in the SHARE_PERIOD_START_BSSID parameter acquired from the IHC1, and sets the SHARE_PERIOD_START parameter to "Timer set A" as set by the IHC1 the BSSID of which is the smallest. Further, it refers to the SHARE_PERIOD parameters in the beacon frames of the IHC1 and the IHC2 to search for the shortest period. As a result, the IHC3 uses the value, "30", of the SHARE_PERIOD parameter of the IHC2 and sets the SHARE_PERIOD parameter to "30" set by the IHC2.

Further, according to the detection of the IHC1 and the IHC2, the IHC3 sets the SHARE_MODE parameter to "2" and adds the IHC1 and the IHC2 to the IHC_LIST. Note that the SHARE_SLOT parameter does not need to be set at this stage (here, "0" (default) is set in the SHARE_SLOT parameter). Then the IHC3 updates the WMUM as shown in FIG. 22 (step S2304) and sends the IHC1 and the IHC2 a management frame (having the Inter-working field in which all variables are set to 0) (step S2305).

The IHC1 and the IHC2 receive the management frame sent from the IHC3 in step S2305 and update each parameter as shown in FIGS. 23 and 24, respectively (step S2102 and step S2202). The IHC1 sets the parameters in such a manner to add the IHC3 to the IHC_LIST and set the SHARE_MODE parameter to "1". Since the value of the SHARE_PERIOD_START_BSSID parameter of the IHC1 is smaller than that of the IHC3, the SHARE_SLOT parameter remains as "0". Then the IHC1 sends these set parameters to the IHC3 as a beacon frame (step S2103).

On the other hand, the IHC2 sets the parameters in such a manner to add the IHC3 to the IHC_LIST and set the SHARE_MODE parameter to "1". Since the value of the SHARE_PERIOD_START_BSSID parameter of the IHC2 is smaller than that of the IHC3, the SHARE_SLOT parameter remains as "0". Then the IHC2 sends these set parameters to the IHC3 as a beacon frame (step S2203).

The IHC3 receives the beacon frames sent from the IHC1 and the IHC2 in step S2103 and step 2203, respectively, and updates each parameter as shown in FIG. 25 (step S2306). In this parameter setting, the SHARE_SLOT parameter is set to "1" (different from the SHARE_SLOT parameters of the IHC1 and the IHC2). Then the IHC3 updates the WMUM as shown in FIG. 26 (step S2307) and sends these set parameters through the wireless medium as a beacon frame (or management frame) so that the IHC1 and the IHC2 will get the frame (step S2308).

Figures 26, 27, 28:
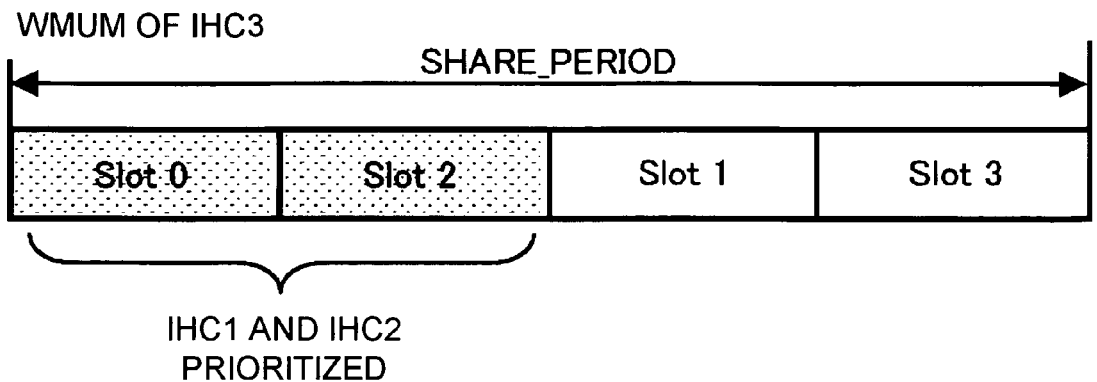
FIG. 26 shows a WMUM updated following the setting of parameters in FIG. 25.
FIG. 27 shows parameters set in step S2104 shown in FIG. 19.
FIG. 28 shows parameters set in step S2304 shown in FIG. 19.
Figure 29:
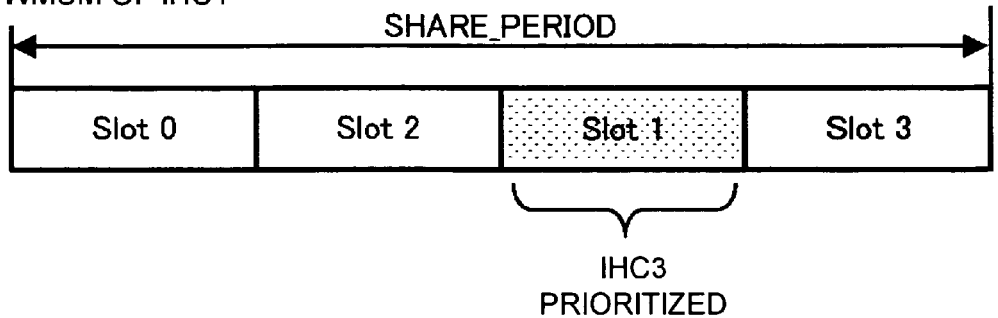
FIG. 29 shows a WMUM updated following the setting of parameters in FIG. 27.
Figure 30:
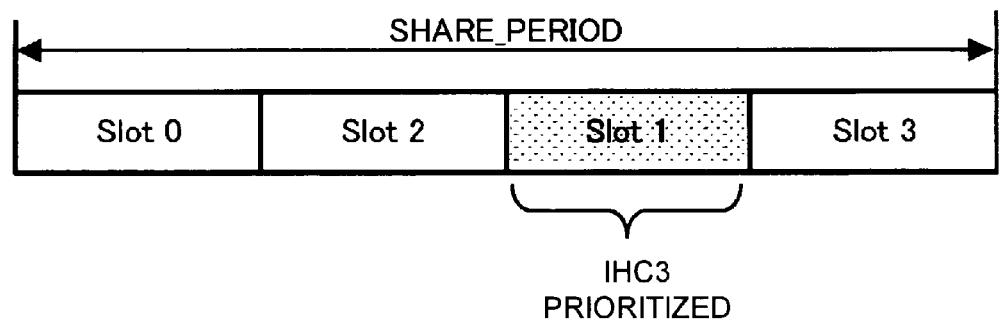
FIG. 30 shows a WMUM updated following the setting of parameters in FIG. 28.

The IHC1 and the IHC2 receive the beacon frame sent from the IHC3 in step S2308 and update each parameter as shown in FIGS. 27 and 28, respectively (step S2104 and step 2204). The IHC1 sets the SHARE_PERIOD parameter to "30". The IHC2 sets the SHARE_PERIOD_START parameter to "Timer set A". Then, the IHC1 and the IHC2 update their WMUMs as shown in FIGS. 29 and 30, respectively (step S2105 and step S2205).

The above-mentioned procedure enables the division of time defined by each SHARE_PERIOD parameter into four time slots 0 to 3 when the IHC1 and the IHC2 overlap with the IHC3, respectively. This enables the IHC1 to take priority in the time slot 0 over the IHC3 and the IHC3 to take priority in the time slot 1 over the IHC1. This also enables the IHC2 to take priority in the time slot 0 over the IHC3 and the IHC3 to take priority in the time slot 1 over the IHC2. After that, the IHC1 and the IHC2 access the wireless medium using SPIFS in the time slot 0, and the IHC1 accesses the wireless medium using LPIFS in the time slots 1, 2, and 3. On the other hand, the IHC3 accesses the wireless medium using SPIFS in the time slot 1 and LPIFS in the time slots 0, 2, and 3.

THIRD EMBODIMENT

Figure 31:
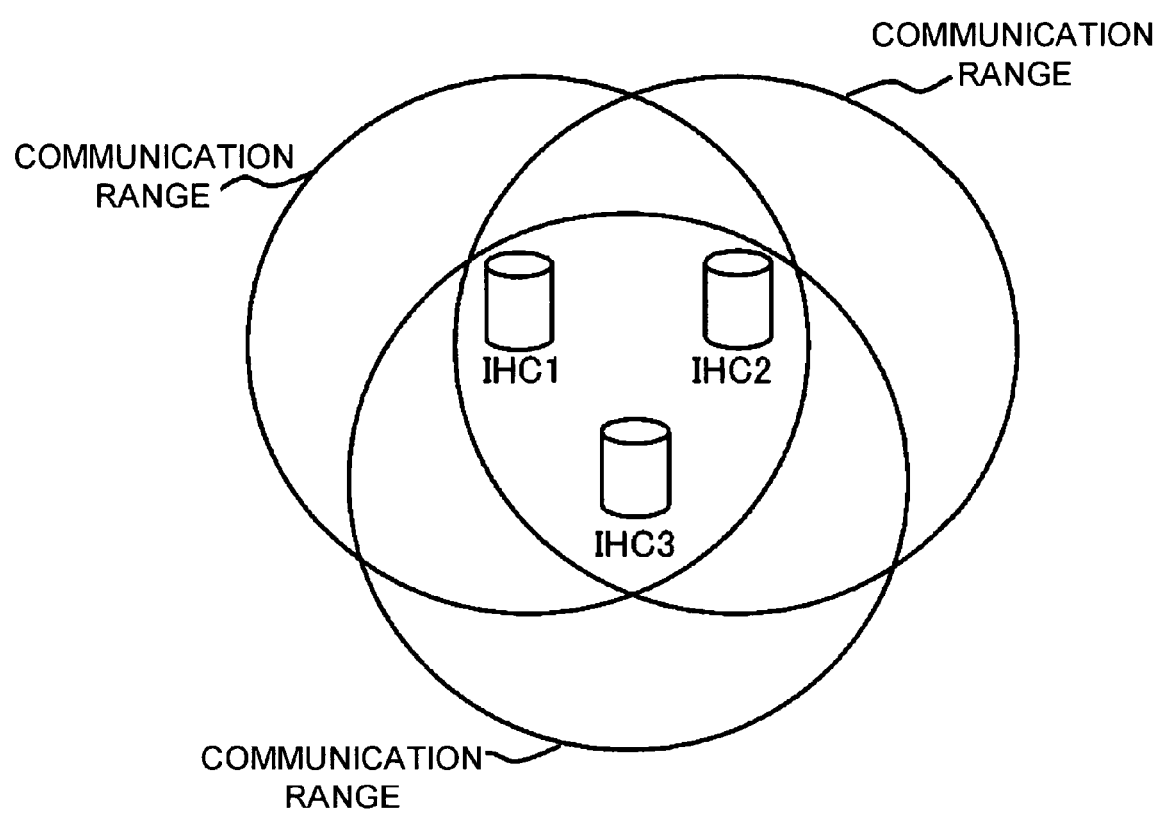
FIG. 31 is a schematic illustration showing such a state that any one of three IHCs that overlap one another is shut down in a third embodiment of the present invention.
Figure 32:
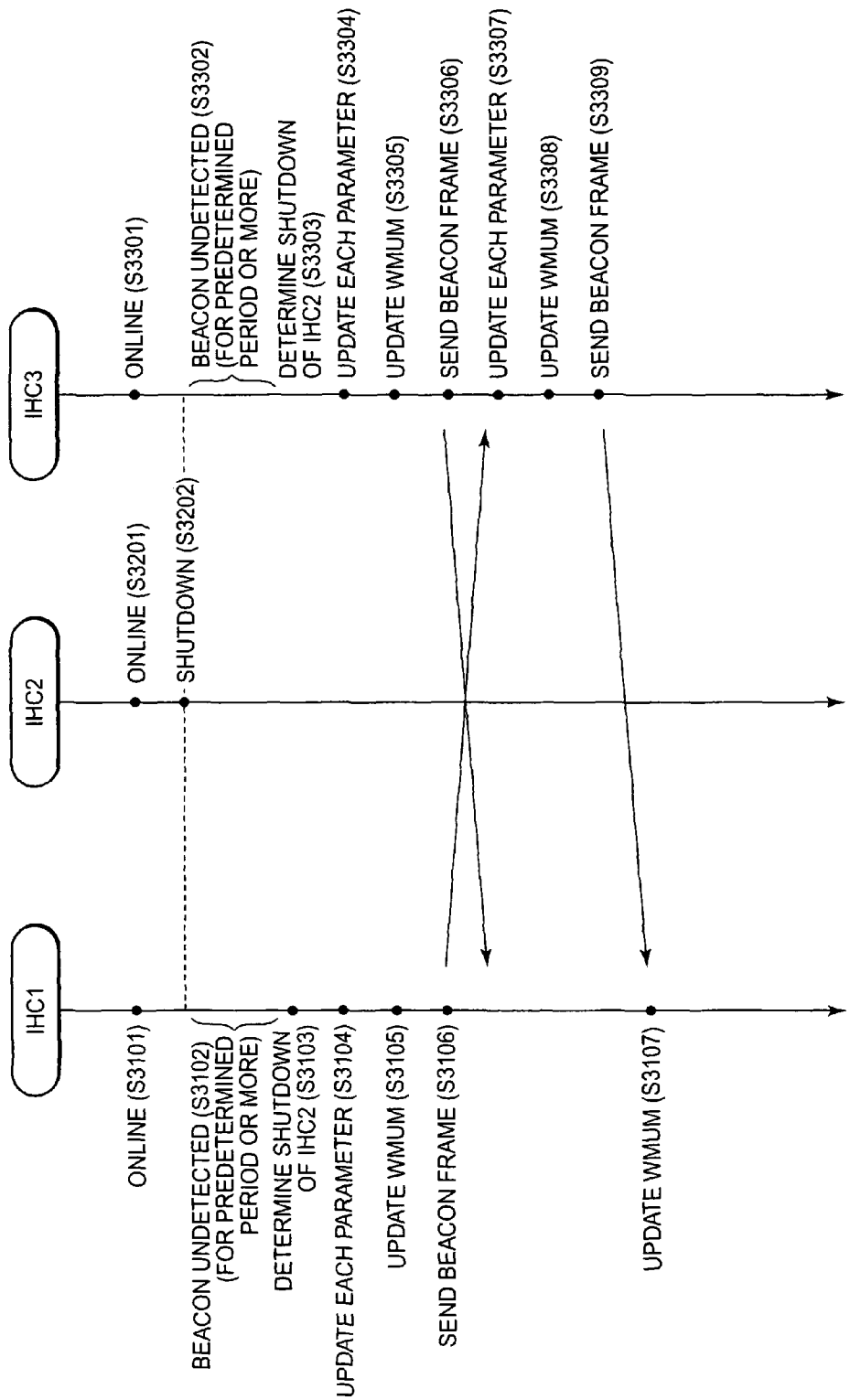
FIG. 32 is a sequence chart showing processing in each IHC in the structure shown in FIG. 31.

The third embodiment of the present invention illustrates a case where any one (for example, IHC2) of three IHCs (IHC1, IHC2, and IHC3), which overlap one another, is shut down. FIG. 31 is a schematic illustration showing such a state that any one of three IHCs that overlap any one another is shut down in the third embodiment of the present invention. FIG. 32 is a sequence chart showing processing in each IHC in the structure shown in FIG. 31. The processing in the structure shown in FIG. 31 will be described according to the sequence chart of FIG. 32. It is assumed that the BSSID of IHC1 is "1", the BSSID of IHC2 is "2", and the BSSID of IHC3 is "3".

Figures 33, 34, 35:
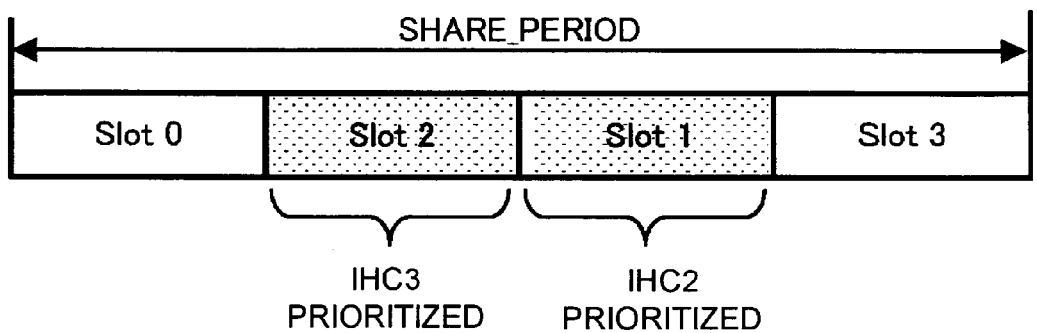
FIG. 33 shows parameters set in step S3101 shown in FIG. 32.
FIG. 34 shows a WMUM held together with the parameters shown in FIG. 33.
FIG. 35 shows parameters set in step S3201 shown in FIG. 32.

IHC1, IHC2, and IHC3 are all online in the initial step. In other words, the SHARE_PERIOD is already divided and each IHC is assigned an access priority. First, the IHC1, IHC2, and IHC3 are all online (step S3101, step S3201, and step S3301). For example, the IHC1 holds the WMUM shown in FIG. 34 after setting the parameters as shown in FIG. 33. The IHC2 holds the WMUM shown in FIG. 36 after setting the parameters as shown in FIG. 35. The IHC3 holds the WMUM shown in FIG. 38 after setting the parameters as shown in FIG. 37.

The SHARE_PERIOD parameters of the IHC1, IHC2, and IHC3 are all set to a common value, "40". The SHARE_MODE parameters of the IHC1, IHC2, and IHC3 are all set to a common value, "2". The SHARE_PERIOD_START parameters of the IHC1, IHC2, and IHC3 are all set to a common value, "Timer set A". The SHARE_PERIOD_START_BSSID parameters of the IHC1, IHC2, and IHC3 are all set to a common value, "1". The SHARE_SLOT parameters of the IHC1, IHC2, and IHC3 are set to "0", "1", and "2", respectively. These parameter settings enable the division of the SHARE_PERIOD on the wireless medium into four time slots in a manner to assign top priority to the IHC1 in the time slot 0, to the IHC2 in the time slot 1, and to the IHC3 in the time slot 2.

Under the circumstances, if the IHC2 is shut down, all the frames related to the IHC2 stop flowing through the wireless medium (step S3202). Since the IHC1 and the IHC3 do not detect any beacon from the IHC2 (step S3102 and step S3302), they determine that the IHC2 has been shut down (step S3103 and step S3303).

The IHC1 and the IHC3 that have detected the shutdown of the IHC2 update each parameter (step S3104 and step S3304), update the WMUM, respectively (step S3105 and step S3305), and send these set parameters to each other as beacon frames (step S3106 and step S3306).

Figures 39, 40, 41:
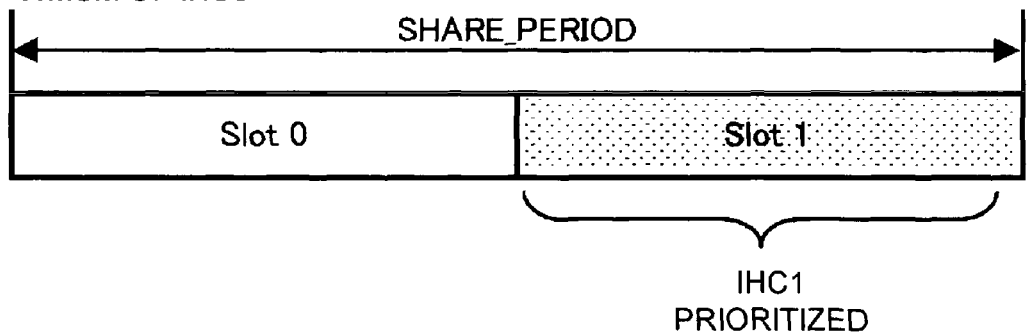
FIG. 39 shows parameters set in step S3104 shown in FIG. 32.
FIG. 40 shows parameters set in step S3307 shown in FIG. 32.
FIG. 41 shows a WMUM updated following the setting of parameters in FIG. 40.

The IHC1 sets (updates) the parameters as shown in FIG. 39 (step S3104). In other words, since the number of IHCs existing on the wireless medium becomes 2, the IHC1 sets the SHARE_MODE parameter to "1", the SHARE_SLOT parameter to "1" as assigned to the IHC2, and deletes the IHC2 from the IHC_LIST. Although the SHARE_SLOT parameter does not necessarily have to be changed, when the SHARE_MODE is changed due to the shutdown of any other IHC, the SHARE_SLOT of the shutdown IHC is changed for the sake of description.

In the parameter setting (updating) of the IHC3 (step S3304), since the number of IHCs existing on the wireless medium becomes 2, the IHC3 also sets the SHARE_MODE parameter to "1", sets the SHARE_SLOT parameter to "1" assigned to the IHC2 (the IHC3 necessarily has to change the SHARE_SLOT parameter because the time slot 2 disappears due to a change in the SHARE_MODE parameter), and deletes the IHC2 from the IHC_LIST.

Next, the IHC1 receives the beacon frame sent from the IHC3 in step S3306, while the IHC3 receives the beacon frame sent from the IHC1 in step S3106. The IHC1 finds that its SHARE_SLOT is the same as that of the IHC3. However, since its BSSID is smaller, the IHC1 does not change it at all. The IHC3 also finds that its SHARE_SLOT is the same as that of the IHC1. In this case, since its BSSID is larger than that of the IHC1, the IHC3 has to reselect a value for the SHARE_SLOT parameter.

Figure 42:
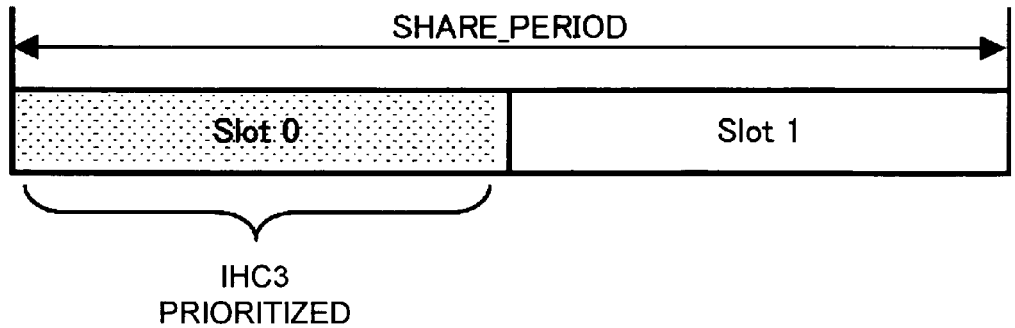
FIG. 42 shows a WMUM updated in step S3107 shown in FIG. 39.

The IHC3 updates the parameter in such a manner to change the SHARE_SLOT parameter to "0" (different from the SHARE_SLOT parameter of the IHC1) as shown in FIG. 40 (step S3307) and updates the WMUM as shown in FIG. 41 (step S3308). Then the IHC3 sends the set parameters to the IHC1 again as a beacon frame (step S3309). The IHC1 receives the beacon frame sent from the IHC3 in step S3309 and updates the WMUM as shown in FIG. 42 (step S3107).

The above-mentioned procedure enables a reduction in the number of divisions of time defined by the SHARE_MODE parameter and the reassignment of time slots to the respective IHCs when the SHARE_MODE parameter needs updating.

FOURTH EMBODIMENT

Figure 43:
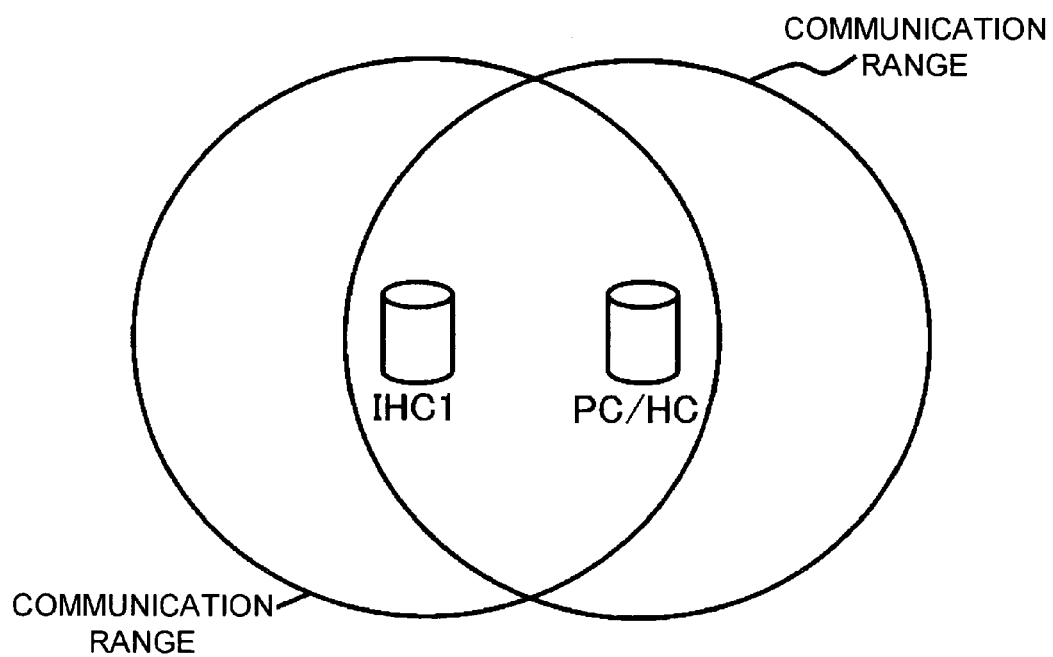
FIG. 43 is a schematic illustration showing such a state that an IHC and a PC/HC overlap in a fourth embodiment of the present invention.
Figure 44:
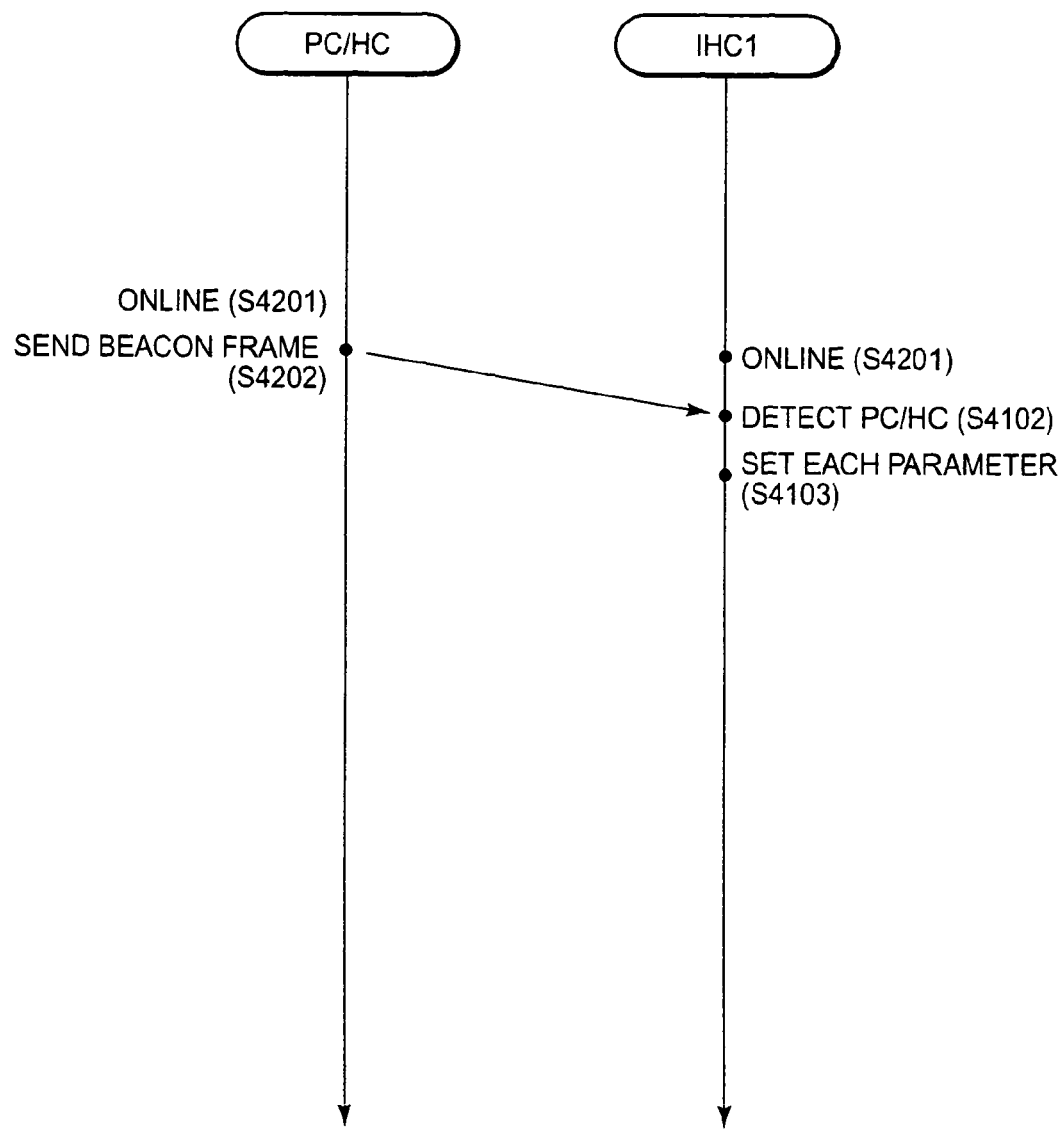
FIG. 44 is a sequence chart showing processing in the IHC and the PC/HC in the structure shown in FIG. 43.

The fourth embodiment of the present invention illustrates a case where an IHC and a PC/HC (a point coordinator or hybrid coordinator in the conventional art) overlap each other. FIG. 43 is a schematic illustration showing such a state that an IHC and a PC/HC overlap in the fourth embodiment of the present invention. FIG. 44 is a sequence chart showing processing in the IHC and the PC/HC in the structure shown in FIG. 43. The processing in the structure shown in FIG. 43 will be described according to the sequence chart of FIG. 44. It is assumed that the BSSID of IHC1 is "1".

Figures 45, 46:
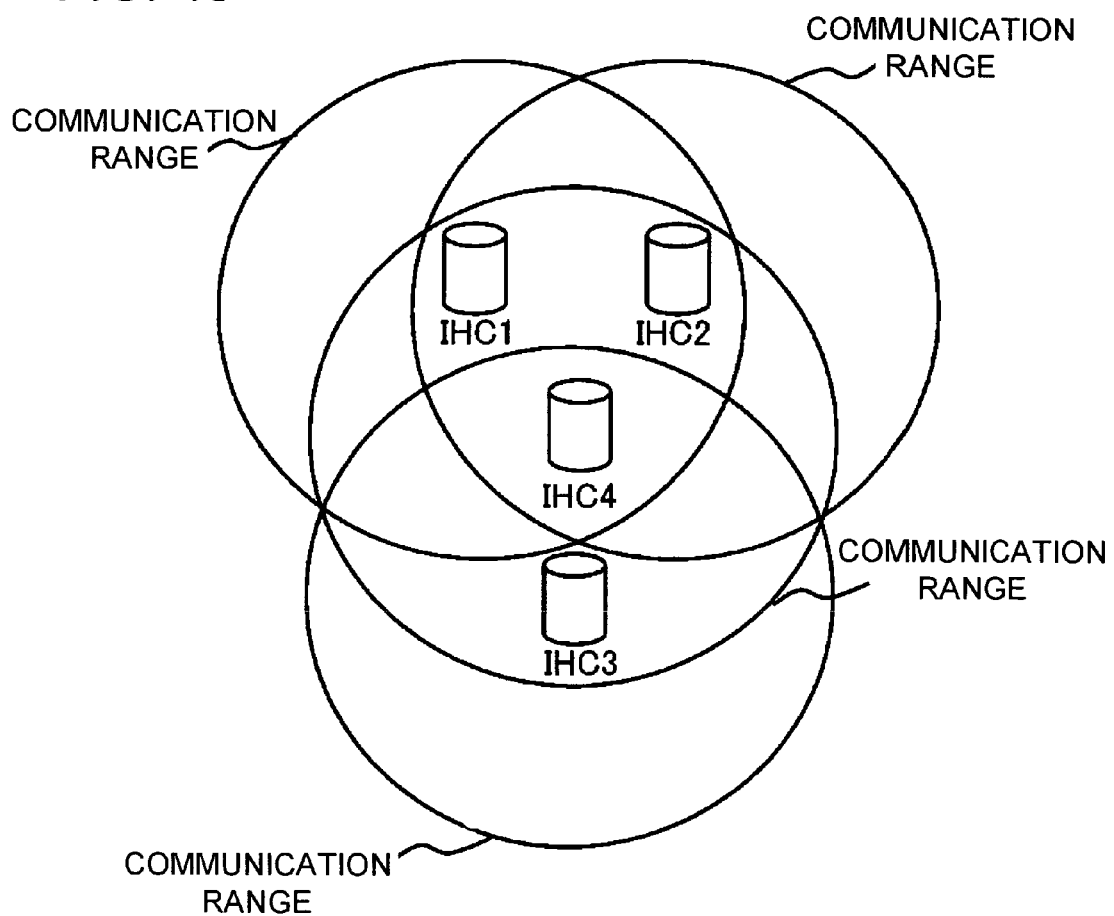
FIG. 45 shows parameters set in step S4103 shown in FIG. 44.
FIG. 46 is a schematic illustration showing such a state that a plurality of IHCs coexist in a fifth embodiment of the present invention.

In the initial step, the PC/HC is online and the IHC1 is offline. In other words, since the PC/HC is online (step S4201), it sends a beacon through the wireless medium at every predetermined cycle. Next, the IHC1 goes online (step S4101), and checks the communication status on the wireless medium to determine if there is any other IHC or PC/HC. In this case, the PC/HC is already online, and the IHC1 detects it on the wireless medium (step S4102). Then the IHC1 sets each parameter as shown in FIG. 45 (step S4103).

In this parameter setting, the IHC1 sets the SHARE_MODE parameter to "1" and divides the SHARE_PERIOD into two time slots. It also sets the SHARE_SLOT parameter to "0". Further, it adds the PC/HC to the IHC_LIST. The other parameters are set to default values, respectively.

The above-mentioned procedure enables the IHC to divide time defined by the SHARE_PERIOD parameter according to the number of PC/HCs with which the IHC1 overlaps, and set a specified time slot so that high access priority will be assigned to the IHC1 in the specified time slot. In this case, the IHC1 have higher access priority (access using SPIFS (<PIFS)) in the selected SHARE_SLOT than any normal PC/HC, and lower access priority (access using LPIFS (>PIFS)) in the other periods. The IHC1 and the PC/HC still have higher priorities than the access from a normal terminal using DIFS (>SPIFS, PIFS, and LPIFS).

FIFTH EMBODIMENT

The fifth embodiment of the present invention illustrates a case where a contention occurs under such a condition that a plurality of IHCs coexist. FIG. 46 is a schematic illustration showing such a state that a plurality of IHCs coexist in the fifth embodiment of the present invention. In FIG. 46, four IHCs (IHC1, IHC2, IHC3, and IHC4) coexist. It is assumed that the BSSID of IHC1 is "1", the BSSID of IHC2 is "2", the BSSID of IHC3 is "3", and the BSSID of IHC3 is "4".

Figures 47, 48, 49:
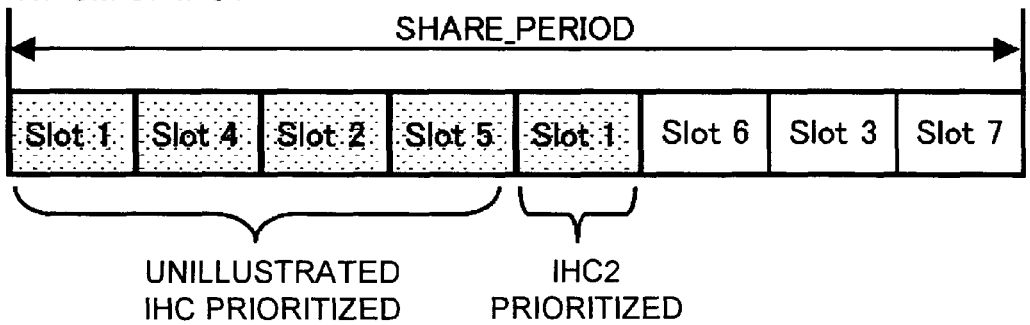
FIG. 47 shows parameters set by IHC1 shown in FIG. 46.
FIG. 48 shows a WMUM held by the IHC1 shown in FIG. 46.
FIG. 49 shows parameters set by IHC2 shown in FIG. 46.

The IHC1, IHC2, and IHC3 are online in the initial step. The IHC1 overlaps with three IHCs (not shown) other than the IHC2 and the IHC4. It sets the parameters as shown in FIG. 47 and holds the WMUM as shown in FIG. 48. The IHC2 overlaps with three IHCs (not shown) other than the IHC1 and the IHC4. It sets the parameters as shown in FIG. 49 and holds the WMUM as shown in FIG. 50. The IHC3 overlaps with the IHC4. It sets the parameters as shown in FIG. 51 and holds the WMUM as shown in FIG. 52.

Figures 53, 54:
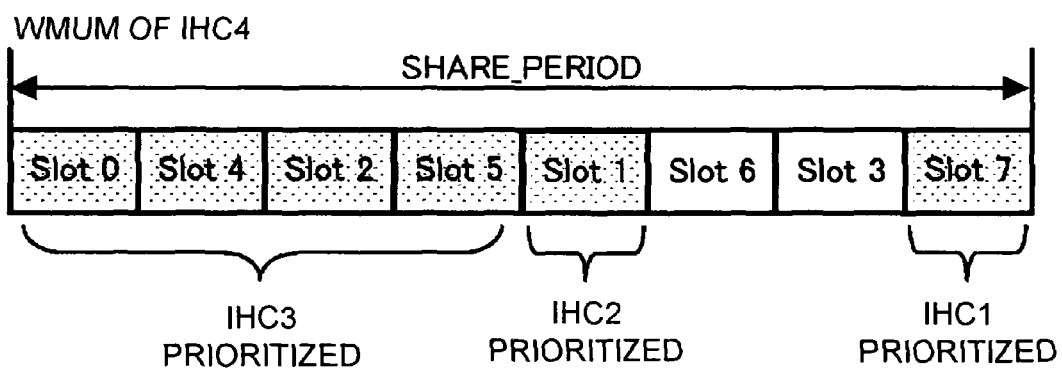
FIG. 53 shows parameters set by IHC4 shown in FIG. 46.
FIG. 54 shows a WMUM held by the IHC4 shown in FIG. 46.

Suppose here that the IHC4 having the largest BSSID finds a time slot contention with the IHC2. In this case, the IHC4 increases the SHARE_MODE parameter to "3" (number of other IHCs=3), instead of using its own SHARE_MODE parameter value "2". In addition, the IHC4 sets the SHARE_SLOT parameter to "6". Finally, IHC4 sets the parameters as shown in FIG. 53, and holds the WMUM as shown in FIG. 54, thus avoiding the contention.

The above-mentioned procedure enables the IHC to increase the SHARE_MODE parameter value when a contention occurs, and divide time defined by the SHARE_PERIOD parameter into finer time slots. Increasing the number of time slots allows the assignment of access priority to the IHC, thus avoiding the contention.

The aforementioned embodiments are just illustrative embodiments of the present invention, and the kinds of parameters used and algorithms for calculating the parameters are not limited to those mentioned above.

INDUSTRIAL APPLICABILITY

As described above, according to the present invention, a given radio communication device in a radio communication system, where any other radio communication device exists in the communication area of the given radio communication device, is assigned a time slot periodically so that the given radio communication device takes priority to access a wireless medium over the other radio communication devices. This can avoid any signal collision in the wireless medium, improving throughput.

Also, according to the present invention, radio communication devices exchange information on the number of other radio communication devices existing in the communication areas of the radio communication devices so that they will work out their communication schedules based on the information. This can change the communication mode in a flexible manner, and hence avoid any signal collision in the wireless medium, thereby improving throughput.

The invention claimed is:

1. A radio communication device in whose communication area other radio communication devices operate, comprising:
    a detection section that detects a number of the other radio communication devices within the communication area of the radio communication device during a time slot, the time slot being used by the radio communication device, and the other radio communication devices operating during the time slot being used by the radio communication device; and
    a contention resolution section that performs contention resolution processing when the detection section detects one or more of the other radio communication devices operating during the time slot being used by the radio communication device,
    said contention resolution section comprising:
        a time slot dividing section that divides the time slot into a plurality of divided time slots, and
        a slot setting section that sets at least one of the plurality of divided time slots as a time slot to be used by the radio communication device,
    wherein a number of the plurality of divided time slots is $2^M$ where M is an integer, and $2^{M-1} \leq N < 2^M$ is satisfied where N is the detected number of the other communication devices.

2. The radio communication device according to claim 1, wherein the time slot dividing section divides the time slot into a plurality of equal width divided time slots.

3. The radio communication device according to claim 1, wherein the contention resolution section comprises an exchanging section that exchanges identification information of the radio communication device with identification information of the other radio communication devices, and the slot setting section is configured to select a higher priority slot which can be used at a higher priority by the radio communication device among the plurality of divided time slots, based on a comparison result of the identification information of the radio communication device with the identification information of the other radio communication devices.

4. The radio communication device according to claim 1, further comprising a time slot identification information sending section that sends identification information of the time slot set to be used by the radio communication device to the other radio communication devices, so that the other radio communication devices select their time slots to be used based on the received identification information of the time slot.

5. The radio communication device according to claim 1, further comprising a higher priority communication section that accesses a wireless medium at a higher priority in the time slot set to be used by the radio communication device, using a waiting time shorter than another waiting time used for the other radio communication devices.

6. The radio communication device according to claim 5, further comprising a lower priority communication section that accesses the wireless medium at a lower priority in other time slots than the time slot set to be used by the radio communication device, using a waiting time longer than another waiting time used for the other radio communication devices.

7. The radio communication device according to claim 1, further comprising a synchronization section that synchronizes with the other radio communication devices regarding a common period which is determined among the radio communication devices.

8. The radio communication device according to claim 1, wherein the radio communication device comprises a time slot resetting section that resets the time slot by decreasing the number of the plurality of divided time slots in the time slot based on the detected number of the other radio communication devices, when the detection section detects that the other radio communication devices which use a lower priority time slot shut down.

9. A radio communication method being performed by a radio communication device in whose communication area other radio communication devices operate, comprising:
    detecting a number of the other radio communication devices within the communication area of the radio communication device during a time slot, the time slot being used by the radio communication device, and the other radio communication devices operating during the time slot being used by the radio communication device; and
    performing contention resolution processing when the radio communication device detects one or more of the other radio communication devices operating during the time slot being used by the radio communication device,
    wherein the radio communication device divides the time slot into a plurality of divided time slots, and sets at least one of the plurality of divided time slots as a time slot to be used by the radio communication device, and
    wherein a number of the plurality of divided time slots is $2^M$ where M is an integer, and $2^{M-1} \leq N < 2^M$ is satisfied where N is the detected number of the other communication devices.

10. The radio communication method according to claim 9, wherein the radio communication device divides the time slot into a plurality of equal width divided time slots.

* * * * *